US010526952B2

(12) United States Patent
Bykowski et al.

(10) Patent No.: US 10,526,952 B2
(45) Date of Patent: Jan. 7, 2020

(54) AIR INTAKE ASSEMBLIES, APPARATUSES AND METHODS FOR AN ENGINE

(71) Applicant: Kohler Co., Kohler, WI (US)

(72) Inventors: Jonathan T. Bykowski, Shorewood, WI (US); Timothy D. Harreld, Hattiesburg, MS (US); Tyler W. Martin, Sumrall, MS (US); William H. Sharp, Petal, MS (US)

(73) Assignee: KOHLER CO., Kohler, WI (US)

( * ) Notice: Subject to any disclaimer, the term of this patent is extended or adjusted under 35 U.S.C. 154(b) by 31 days.

(21) Appl. No.: 15/887,146

(22) Filed: Feb. 2, 2018

(65) Prior Publication Data

US 2018/0223722 A1 Aug. 9, 2018

Related U.S. Application Data

(60) Provisional application No. 62/455,701, filed on Feb. 7, 2017.

(51) Int. Cl.
| | |
|---|---|
| *F01P 11/12* | (2006.01) |
| *F01P 11/10* | (2006.01) |
| *F02M 35/16* | (2006.01) |
| *F02M 35/06* | (2006.01) |
| *F02M 35/024* | (2006.01) |

(Continued)

(52) U.S. Cl.
CPC ............... *F01P 11/12* (2013.01); *F01P 11/10* (2013.01); *B01D 46/0056* (2013.01); *B01D 46/10* (2013.01); *F01P 5/02* (2013.01); *F01P 5/06* (2013.01); *F02M 35/02416* (2013.01); *F02M 35/02466* (2013.01); *F02M 35/02475* (2013.01); *F02M 35/06* (2013.01); *F02M 35/08* (2013.01); *F02M 35/16* (2013.01)

(58) Field of Classification Search
CPC .... F01P 11/12; F01P 11/10; F01P 5/06; F01P 5/02; B01D 46/10; B01D 46/0056; F02M 35/08; F02M 35/02416; F02M 35/02466; F02M 35/02475; F02M 35/06; F02M 35/16

See application file for complete search history.

(56) References Cited

U.S. PATENT DOCUMENTS

| | | |
|---|---|---|
| 4,589,379 A | 5/1986 | Fujikawa et al. |
| 5,046,458 A | 9/1991 | Kronich |

(Continued)

*Primary Examiner* — Jacob M Amick
*Assistant Examiner* — Charles Brauch
(74) *Attorney, Agent, or Firm* — Klintworth & Rozenblat IP LLP

(57) ABSTRACT

Intake assemblies for an engine are provided. In one aspect, an air intake assembly includes a screen defining a plurality of air passage holes therein, a fan, a flywheel, a crankshaft, and a screen support member coupled to the screen. The fan, the flywheel and the screen support member are coupled to the crankshaft with a single fastener, and the screen, the fan, the flywheel, the crankshaft and the screen support member all rotate together. In one aspect, the screen support member supports the screen a distance away from the fan such that the screen is completely spaced-apart from and does not engage the fan. In one aspect, a screen support member includes a base near one end of the screen support member and a plurality of coupling locations near a second end. The screen couples to the screen support member at the plurality of coupling locations.

15 Claims, 27 Drawing Sheets

(51) Int. Cl.
    *F02M 35/08*     (2006.01)
    *F01P 5/06*     (2006.01)
    *B01D 46/10*     (2006.01)
    *F01P 5/02*     (2006.01)
    *B01D 46/00*     (2006.01)

(56) References Cited

U.S. PATENT DOCUMENTS

| | | | |
|---|---|---|---|
| 5,285,751 A | | 2/1994 | Liegeois et al. |
| 5,494,006 A | * | 2/1996 | Davis, Jr. ............... F01P 11/12 123/198 E |
| 7,412,962 B1 | * | 8/2008 | Nelson ............... A01D 34/001 123/198 E |
| 7,878,171 B2 | | 2/2011 | Vandike et al. |
| 7,914,609 B2 | | 3/2011 | Sullivan et al. |
| 8,746,186 B2 | * | 6/2014 | Sullivan ............... F01P 11/12 123/198 E |

* cited by examiner

AIR INTAKE ASSEMBLIES, APPARATUSES AND METHODS FOR AN ENGINE

RELATED APPLICATIONS

The present application claims the priority benefit of U.S. Provisional Patent Application No. 62/455,701, filed Feb. 7, 2017, which is incorporated by reference herein.

BACKGROUND

Grass screens can be used for lawn mowers and other machines to help protect an engine cooling fan. In some instances, a grass screen can prevent grass and/or other debris from entering and damaging the fan and/or prevent blockage of cooling passages.

SUMMARY

In one aspect, systems and methods can provide a screen including air passages positioned above a cooling fan for an engine, with the air passages configured to allow the entry of air to a cooling fan of an engine, but reject debris. The screen can further include embossments to provide disruptions to push away the debris from the screen. A cup is configured to connect the screen with the cooling fan so that the screen rotates along with the cooling fan.

In one aspect, a screen for a cooling fan includes a generally round plate formed to give an overall dome shape. The round plate may be made of steel and support bars are integrated into the steel plate, which meet in a center of the steel plate. Embossments are positioned between the support bars.

In one aspect, an air intake assembly for an engine is provided. The air intake assembly includes a screen defining a plurality of air passage holes therein configured to allow passage of air through the screen and into the engine, a fan, a flywheel, a crankshaft, and a screen support member coupled to the screen. The fan, the flywheel and the screen support member are coupled to the crankshaft with a single fastener, and the screen, the fan, the flywheel, the crankshaft and the screen support member all rotate together when coupled to the crankshaft with the single fastener.

In one aspect, the screen, the fan, the flywheel, the crankshaft and the screen support member may all rotate about a rotational axis. The rotational axis may extend through a longitudinal center of the single fastener.

In one aspect, the fan may be compressed between the screen support member and the flywheel when coupled together with the single fastener.

In one aspect, the crankshaft may define a threaded aperture and the single fastener may be a single threaded fastener. The single threaded fastener may pass through the fan and the flywheel without threading thereto and may threadably engage the threaded aperture of the crankshaft.

In one aspect, the fan may be compressed between the screen support member and the flywheel when coupled together with the single threaded fastener.

In one aspect, the screen may be coupled to the screen support member in a plurality of locations.

In one aspect, the screen may be coupled to the screen support member in the plurality of locations with a plurality of fasteners.

In one aspect, the screen support member may include a plurality of spaced-apart legs extending from the base, and the screen may be coupled to each of the plurality of spaced-apart legs with a fastener.

In one aspect, the single fastener may be different than the fasteners used to couple the screen to the screen support member.

In one aspect, at least one of the plurality of legs may define a hole therein.

In one aspect, each of the plurality of legs may define a plurality of holes therein.

In one aspect, an air intake assembly for an engine is provided. The air intake assembly includes a screen defining a plurality of air passage holes configured to allow passage of air therethrough and into the engine, a fan, and a screen support member coupled to the screen and the fan. The screen, the fan and the screen support member all rotate together. The screen support member supports the screen a distance away from the fan such that the screen is completely spaced-apart from and does not engage the fan.

In one aspect, a gap may be provided between the screen and the fan. The air intake assembly may further include a screen clearing member extending through the gap between the screen and the fan. A portion of the screen clearing member may be positioned in an interior of the screen.

In one aspect, the portion of the screen clearing member may be in close proximity to and does not engage an interior surface of the screen.

In one aspect, the portion of the screen clearing member may be within 3 millimeters of the interior surface of the screen.

In one aspect, the screen clearing member may be coupled to a blower housing of the engine. The screen, the fan and the screen support member may rotate relative to the screen clearing member.

In one aspect, the screen clearing member may include at least one projection configured to engage the blower housing.

In one aspect, the screen clearing member may be coupled to the blower housing beyond the interior of the screen.

In one aspect, an air intake assembly for an engine is provided. The air intake assembly includes a screen defining a plurality of air passage holes configured to allow passage of air therethrough and into the engine and a screen support member including a base near one end of the screen support member and a plurality of coupling locations near a second end of the screen support member. The screen couples to the screen support member at the plurality of coupling locations, and the base of the screen support member is coupled to a crankshaft of the engine to rotate the screen and screen support member together.

In one aspect, the screen support member may include a plurality of spaced-apart legs extending from the base. Each of the plurality of spaced-apart legs may include a first end proximate the base and a second end distal the base. The second ends of the plurality of spaced-apart legs may define the coupling locations.

In one aspect, the screen support member may be unitarily formed as one-piece.

In one aspect, the base may define a hole therein. The intake assembly may further include a single fastener positioned in the hole and directly engaging the crankshaft to couple the screen and the screen support member to the crankshaft.

In one aspect, each of the plurality of legs may define at least one hole therein.

In one aspect, the plurality of legs may diverge from one another in a direction extending from the base toward the second ends of the legs.

In one aspect, each of the plurality of legs may include a pair of opposing edges defining a width of each leg between the edges, and the width of each of the plurality of legs may decrease in the direction extending from the base toward the second ends of the plurality of legs.

In one aspect, each of the plurality of legs may have an airfoil shape.

In one aspect, a screen for an air intake assembly of an engine is provided. The screen includes a round sheet of material formed into a dome defining an interior surface and an exterior surface. An interior cavity of the dome is formed by the interior surface. The screen also includes a plurality of holes defined through the round sheet from the exterior surface to the interior surface, a plurality of channels formed in the top surface of the round sheet to divide the round sheet into three portions, and a plurality of embossments on the top surface of the round sheet. One of the plurality of embossments is on each of the three portions, and each embossment has a perimeter defined by two of the plurality of channels and an exterior edge. The exterior edge of each of the embossments undulates there along between the two channels.

In one aspect, the round sheet may further include a fastener hole extending therethrough configured to receive a fastener, and the fastener hole may be positioned in the embossment.

In one aspect, the round sheet may further include three fastener holes configured to receive a fastener through each of the three fastener holes. One of the plurality of fastener holes may be positioned in each of the three embossments.

In one aspect, the exterior edge of each of the plurality of embossments may comprise a first concave portion, a second concave portion, and a projecting portion between the two concave portions.

In one aspect, at least some of the plurality of holes may be defined in the plurality of channels.

In one aspect, the round sheet may include a perimeter and the round sheet may be turned-down at the perimeter to provide a lip. At least some of the plurality of holes may be defined in the lip.

In one aspect, the screen may further include a plurality of support bars formed in the round sheet. The plurality of support bars may define the plurality of channels therein.

In one aspect, the plurality of support bars may be thicker from the interior surface to the exterior surface than a remainder of the round sheet from the interior surface to the exterior surface.

In one aspect, the plurality of support bars and the plurality of embossments may serve a dual purpose of providing dynamic stiffness to the screen and knocking away debris from the screen.

Other systems, methods, apparatuses, assemblies, features, and advantages are or will become apparent upon examination of the following figures and detailed description. It is intended that all such additional systems, methods, features, and advantages be included within this description and be protected by the accompanying claims.

BRIEF DESCRIPTION OF THE DRAWINGS

In association with the following detailed description, reference is made to the accompanying drawings, where like numerals in different figures can refer to the same element. The features of the drawings are not necessarily drawn to scale.

DETAILED DESCRIPTION

Figure 1:
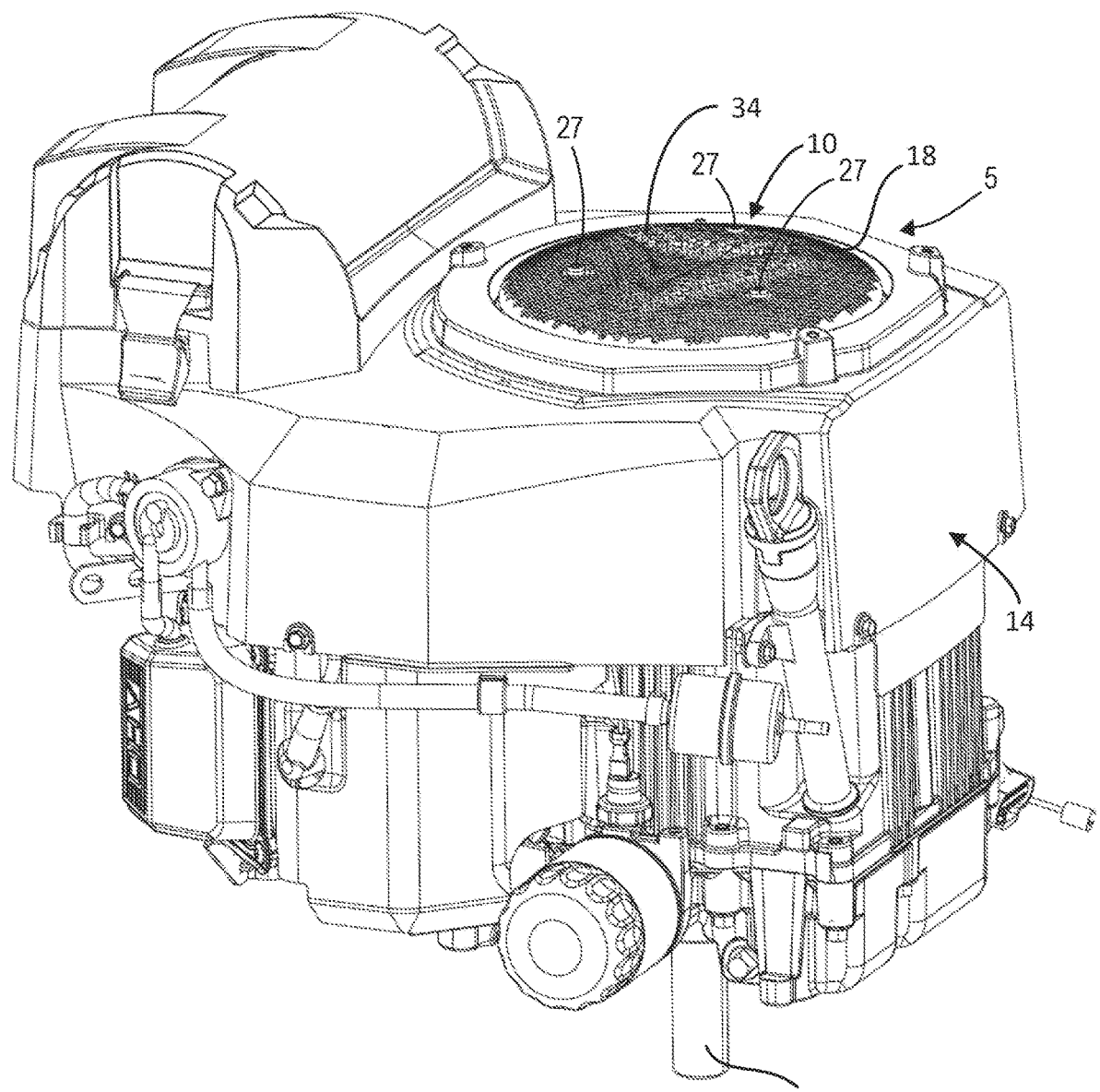
FIG. 1 is a schematic of an example screen assembly connected to an example engine.
Figure 2:
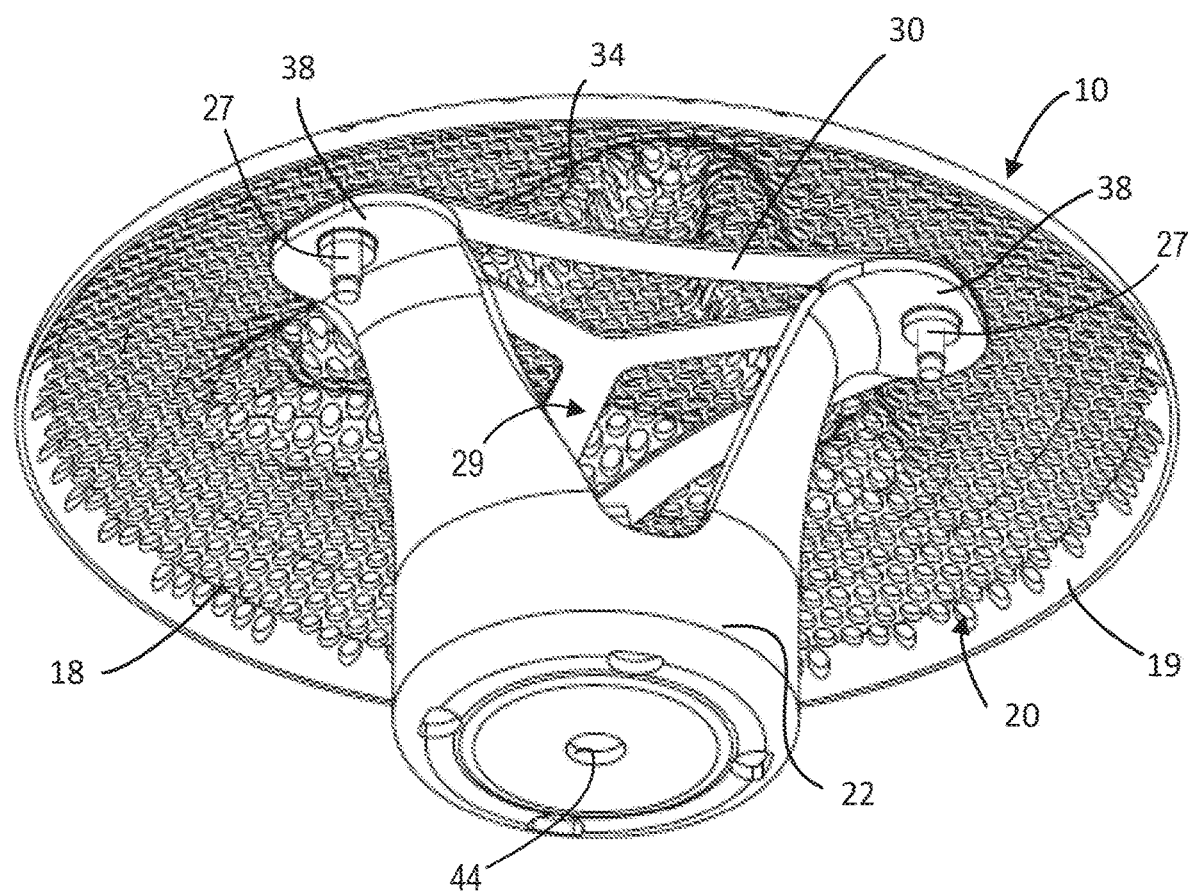
FIG. 2 is a lower perspective view of the example screen assembly including an example screen connected with an example plate and an example cup.
Figure 3:
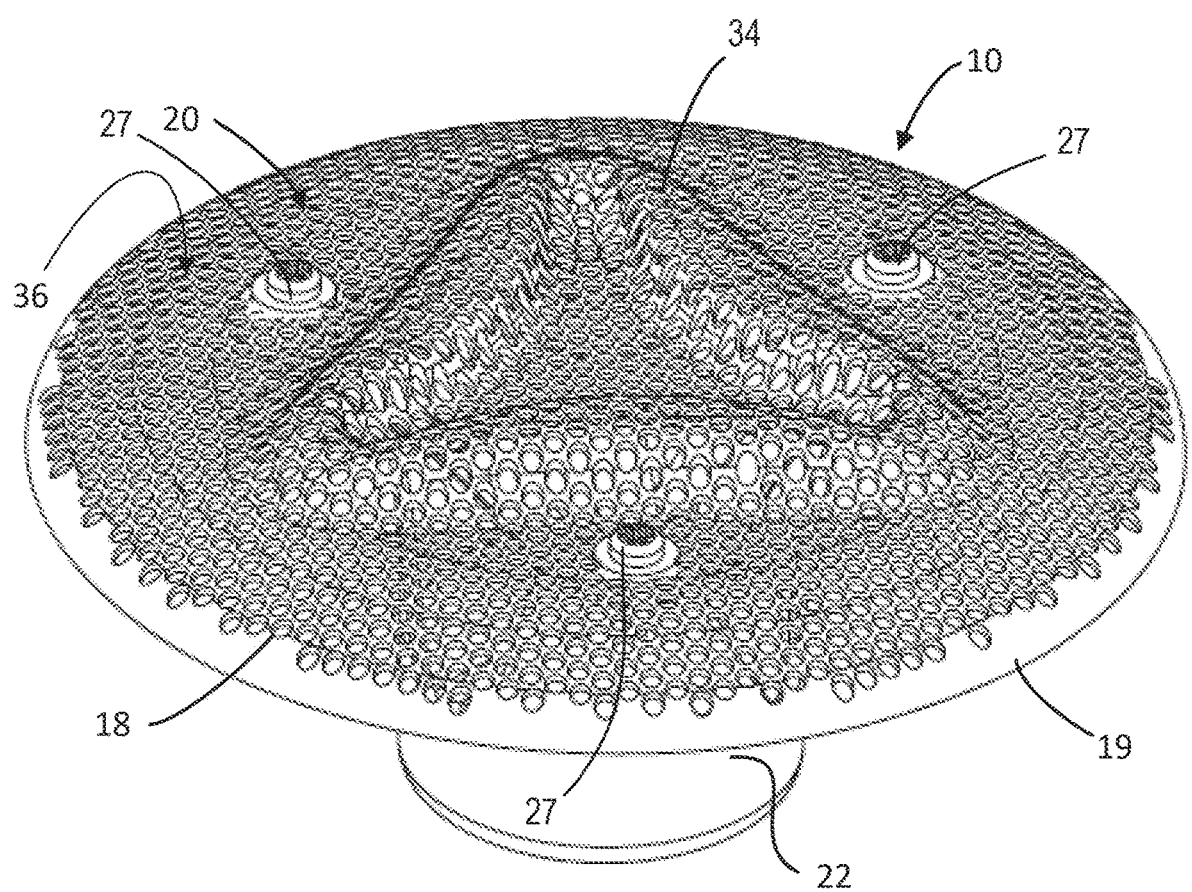
FIG. 3 is a top perspective view of the example screen connected with the example plate and the example cup.

While the disclosure may be susceptible to embodiments in different forms, there is shown in the drawings, and herein described in detail, specific embodiments with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It is further appreciated that in some embodiments, one or more elements illustrated by way of example in a drawing(s) may be eliminated and/or substituted with alternative elements within the scope of the disclosure.

An air intake assembly 5 for an engine 14 is provided and can inhibit and/or stop grass and/or other debris from entering a cooling fan 12 of an engine 14. A screen 18 and/or sieve-like component (hereinafter referred to as a screen) can inhibit and/or stop grass and/or other debris from entering the cooling fan 12 of the engine 14. The screen 18 can be attached to the cooling fan 12 via a screen support member or cup 22 (hereinafter referred to a cup), which is attached to the crankshaft 16 of the engine 14. Therefore, the screen 18 can spin at a same speed as the crankshaft 16 and of the engine 14 operation. The screen 18 can be designed to admit cooling air to the cooling fan 12, but block debris. In some embodiments, the screen 18 can include a plurality of formed shapes (e.g., embossments 34) and/or a plurality of structural members, depending on an implementation, to move debris away from the screen 18 and/or provide the screen 18 with dynamic stiffness and resistance to the forces that can cause fatigue to the screen 18.

Figure 11:
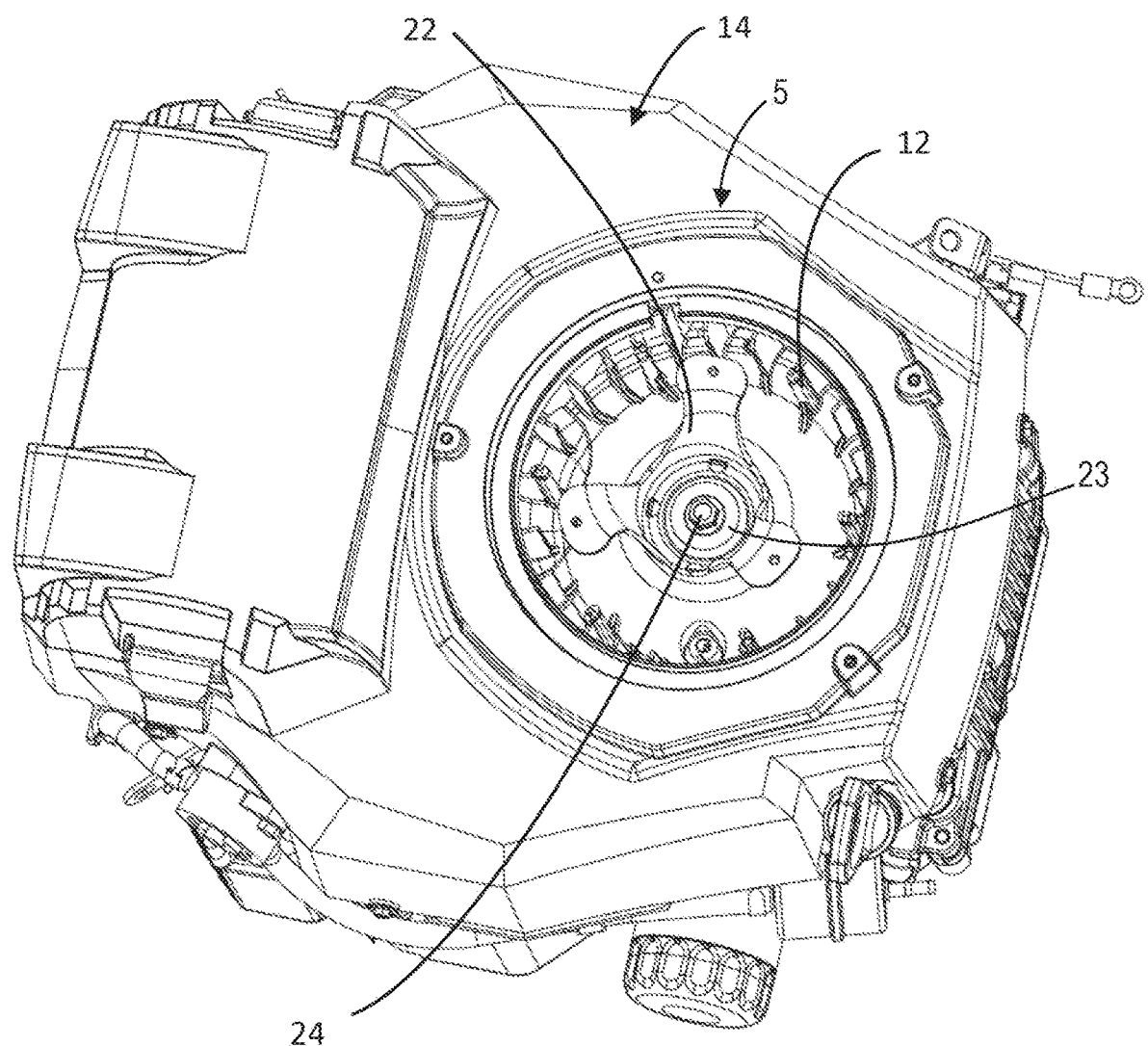
FIG. 11 is a top perspective view of the example cup and an example fan mounted to the example flywheel of the example engine.
Figure 12:
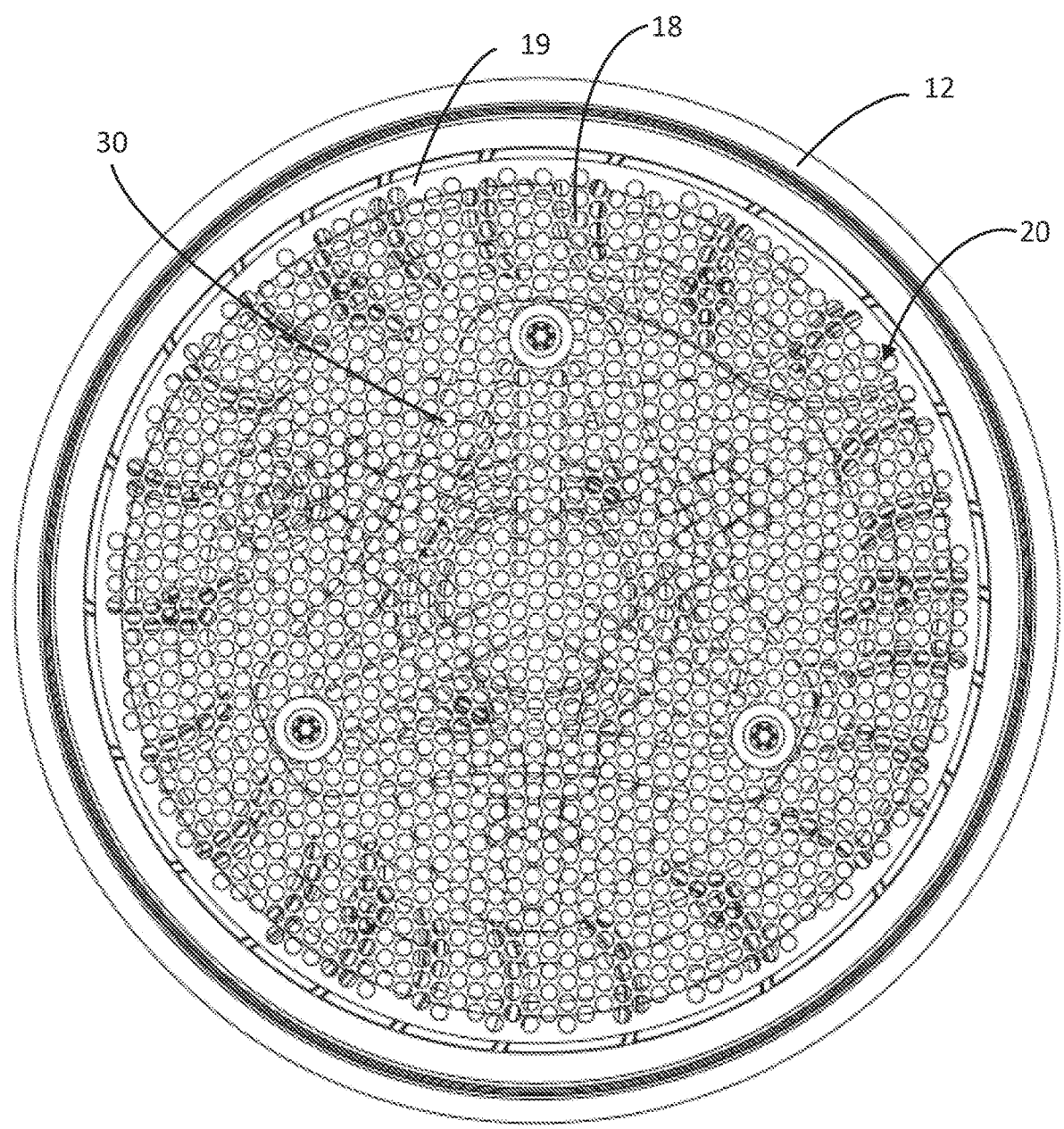
FIG. 12 is a top view of the example screen assembly mounted to the example fan.
Figure 13:
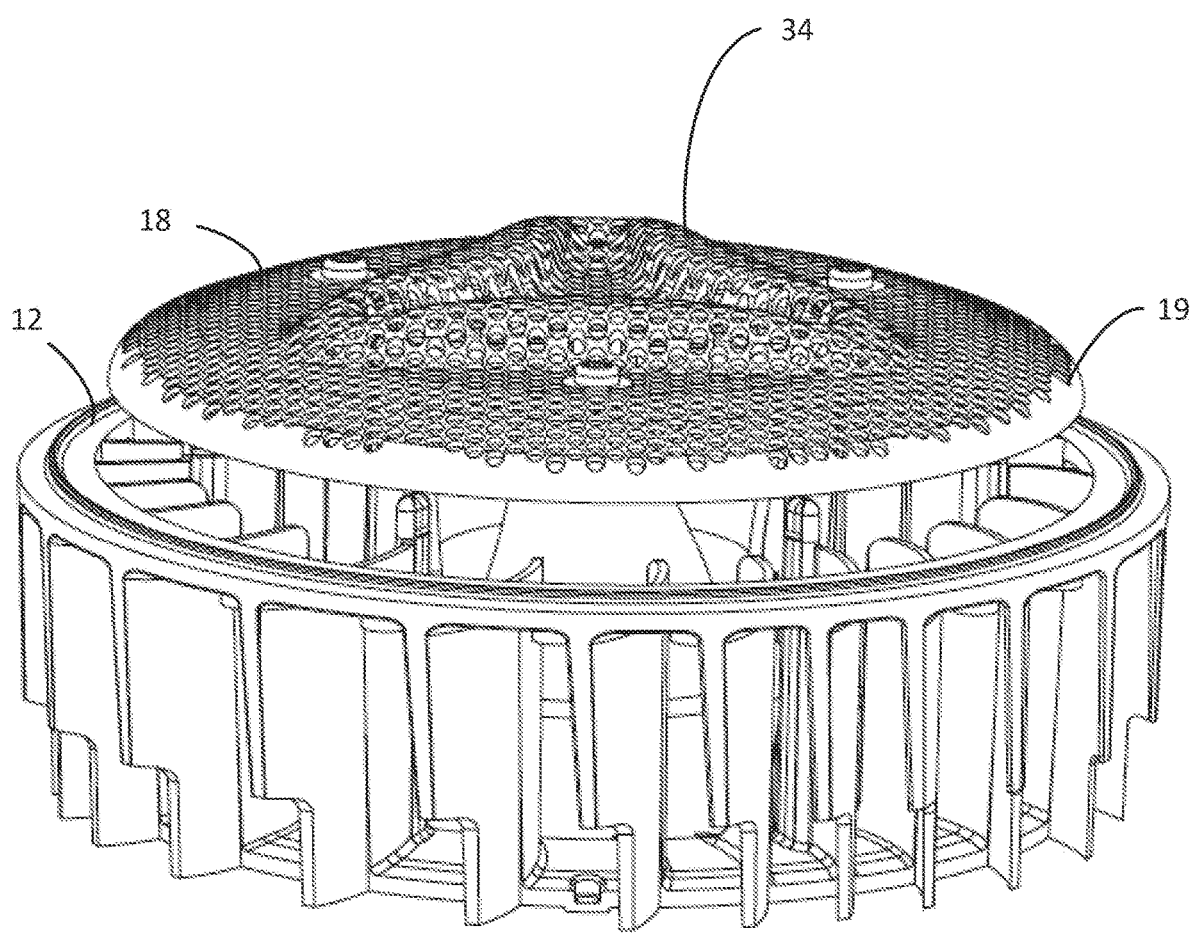
FIG. 13 is a top perspective view of the example screen assembly mounted to the example fan.
Figure 14:
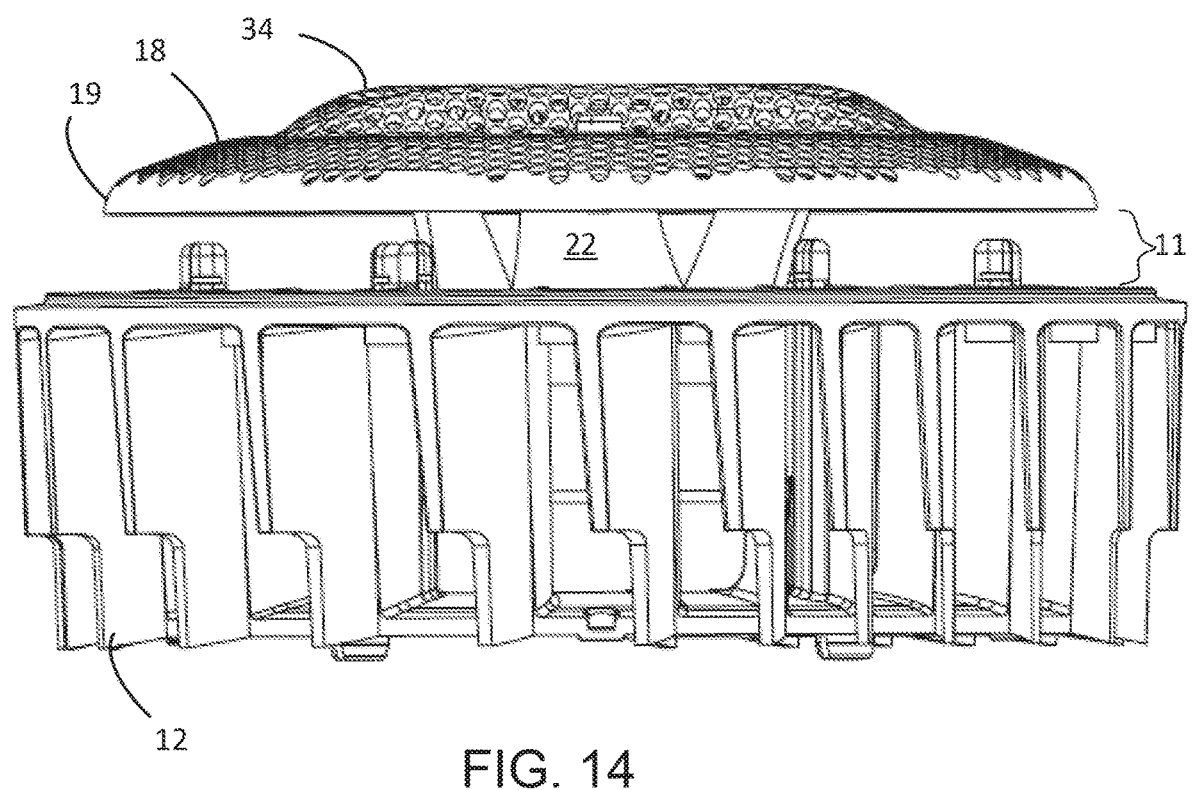
FIG. 14 is a side view of the example screen assembly mounted to the example fan.
Figure 15:
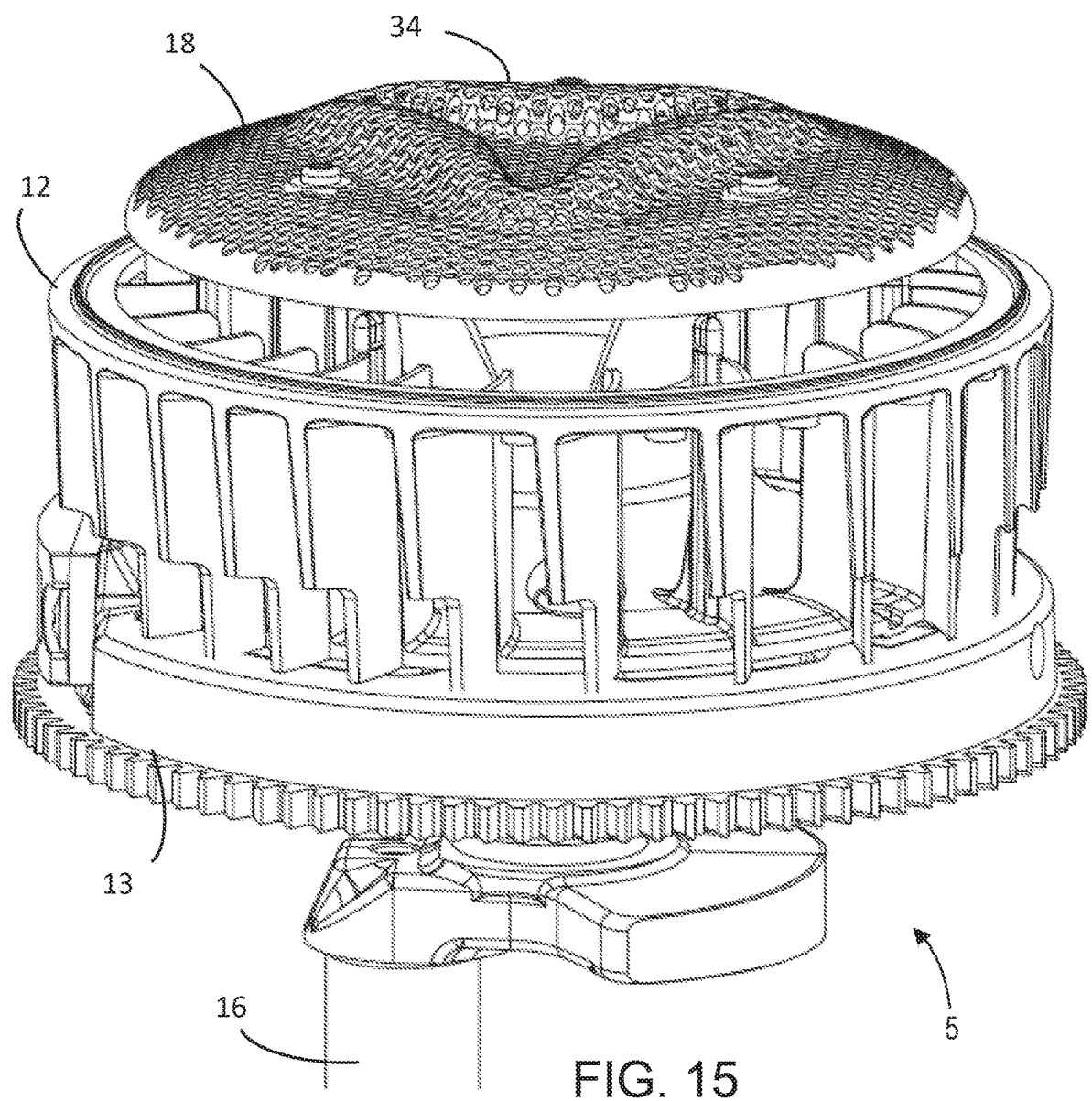
FIG. 15 is a top perspective view of the example screen assembly mounted to the example fan, flywheel and an example crankshaft.

Referring to FIGS. 1-15, the screen 18 and the cup 22 may be referred to as a screen and cup assembly 10, which protects a rotating cooling fan 12 by mounting to a flywheel 13 of an engine 14. In operation, the cooling fan 12 can be positioned between the screen and cup assembly 10 and the flywheel 13, and held in place by the screen and cup assembly 10 being mounted to the flywheel 13. The screen and cup assembly 10 can include a screen 18, or other sieve-like component, which provides air passages 20 designed to admit the cooling air to the cooling fan 12, but block debris. The screen and cup assembly 10 also includes a cup 22 which mounts on one end (pads 38) to the screen 18 and at the opposite end (cylinder end 26) to flywheel 13. The cup 22 can mount to the flywheel 13 via a bolt 24 or other fastener (see FIG. 11) and a washer 23 disposed between the bolt 24 and the cup 22. The cooling fan 12 is coupled in place and the screen 18 (or screen 118—see FIGS. 18-20) may be coupled to the cup 22 with a plate 30 and a plurality of fasteners 27. In the illustrated embodiment, the screen 18 is coupled to the cup 22 and plate 30 with three fasteners. In other embodiments, the screen 18 may be coupled to the cup 22 and the plate 30 with any number of fasteners. In the illustrated embodiment, the single bolt or fastener 24 secures the entire assembly of the screen 18, the cup 22, the cooling fan 12, and the flywheel 13 to the crankshaft 16. The bolt or fastener 24 is centrally located in the screen 18, the cup 22, the cooling fan 12, and the flywheel 13.

Figure 29:
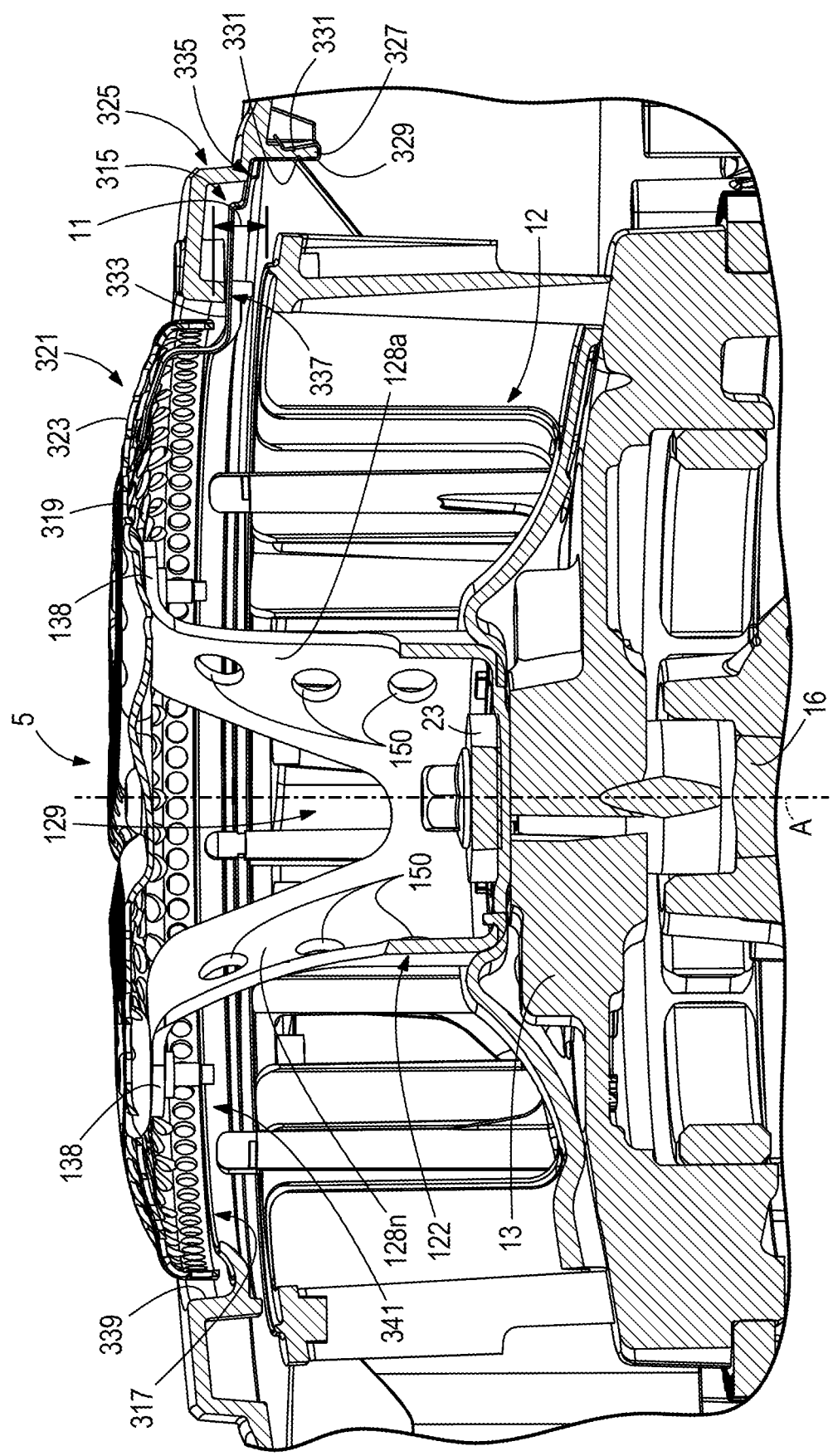
FIG. 29 is a cross-sectional view taken along line 29-29 in FIG. 26.
Figure 30:
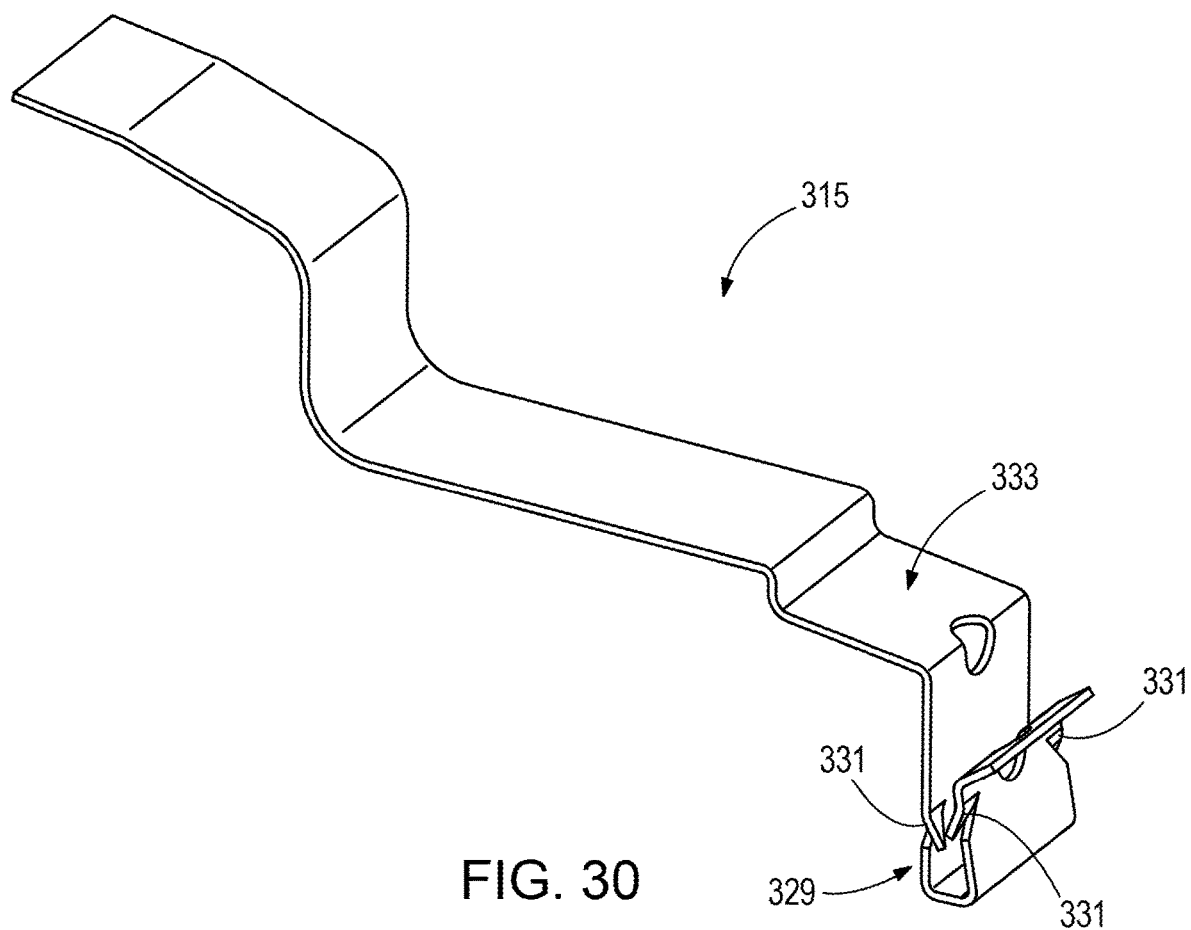
FIG. 30 is a top perspective view of the example screen clearing member.

In one implementation, the engine 14 includes an air cooled internal combustion engine. Other types of engines can use the screen and cup assembly 10. Additionally or alternatively, the screen and cup assembly 10 can be used with other types of machinery that includes fans. Since the flywheel 13 mounts to a crankshaft 16 of the engine 14, the screen and cup assembly 10 rotates along with the operation of the engine 14. The screen 18, the cup 22, the fan 12, the flywheel 13, and the crankshaft 16 all rotate about a rotational axis A, which extends through a longitudinal center of the fastener 24 and centers of the screen 18, cup 22, fan 12, flywheel 13 and crankshaft 16 (see e.g., FIG. 29, but applies to all embodiments). Because the engine 14 may be used in a multitude of environments, the debris can take many forms: plant clippings, wood chips, rocks, sand, sticks, etc. Without the screen 18, the debris can clog cooling passages of the engine, and/or in some cases the cooling air passages 20 of the screen 18, making it difficult for the engine 14 to be properly cooled and reducing its useful life. In some embodiments, the screen 18 can keep the debris out of the cooling fan 12 and/or redirect the debris away from the cooling air passages 20.

The cup 22 includes a generally cylindrical end 26 mounted with the flywheel 13, and legs 28a-n connected with the screen 18. The cylindrical end 26 can include a solid material to provide high stiffness to the mount to the flywheel 13. In some implementations there are three legs 28a-n with alternating open areas 29 between the legs 28a-n, but more or less legs can be used. In some embodiments, the entire cup may be a solid component with no open areas and no legs. The legs 28a-n can support the screen 18 above the fan 12 to provide a gap 11 between the fan 12 and the screen 18 (see, e.g., FIG. 14). In some embodiments, the screen and cup assembly 10 can also include the plate 30 positioned between the legs 28a-n and the screen 18 to provide additional strength to the screen 18. The plate 30 can be generally triangular shaped with outer bars 31a connecting at triangular points 32 to line up with the legs 28a-n of the cup 22. Inner tie-bars 31b connect at center point 31c to provide additional structure to the plate 30 and the screen 18. In some embodiment, additional structural features are integrated into the screen, e.g., screen 118 (FIGS. 18-20) to help insure structural integrity, as described in more detail below.

With the screen and cup assembly 10 directly mounted to part of the engine 14 assembly, e.g., the flywheel 13, the screen and cup assembly 10 can be subject to vibration from the engine 14 caused by the movement and acceleration of engine components during operation of the engine 14. The masses of these reciprocating and rotating engine components are accelerated into motion and accelerated out of motion, as the components go through prescribed displacements that are dictated by the linkages and design of the engine 14. These accelerations are reacted through the bearing surfaces of the engine components, and an overall sum of all accelerations acts upon the mounting of the engine 14. Generally, there is some remainder of acceleration, as not all forces can be balanced completely, or absorbed by the mass of the engine 14. The result can be in the form of harmonic accelerations at various magnitudes and directions, at frequencies which are orders of the operational speed of the engine 14. Orders can be described as even factors of the frequency of engine speed. The accelerations can be particularly strong at the ½, first, one and ½, and second orders of engine RPM, which can be encompassed by the 20 to 200 Hz frequency band, when considering an exemplary utility engine. Harmonic accelerations continue to higher frequencies at higher engine speed orders, though the amount of energy diminishes as the frequency increases. The screen and cup assembly 10 can experience repeated harmonic accelerations at many frequencies. The potential for strain damage within engine mounted structures can be exacerbated if harmonic acceleration loads occur at, or near, one of the natural frequencies of the structure, therefore a high dynamic stiffness of the screen and cup assembly 10 can be desired.

The screen and cup assembly 10 mounted to the flywheel 13/crankshaft 16 of the engine 14 can be additionally subject to the forces of rotation. These can be described as centripetal forces, where the mass of the component acts as if it were being flung outward, away from the axis of rotation. A magnitude of these forces increases with the rotational speed, and also increase with the position of the mass and structure relative to the axis of rotation. Engine 14 speed changes by the control of the engine operator, but even at a fixed overall engine 14 speed, the rotational speed is not constant. There are reductions in engine 14 speed as the fuel and air mixture are compressed, and increases in engine 14 speed when the fuel and air are combusted. The instantaneous accelerations in engine speed also induce angular acceleration forces that cause strain in the components.

In some embodiments, the screen 18 of the screen and cup assembly 10 can include generally formed triangular shape embossments or projections 34 positioned thereon which provide structure and/or undulations and disruptions to a top surface 36, e.g., exposed portion, of the screen 18. Other shaped embossments 34 for the undulations can be used, including but not limited to a square, rectangular, circular, oval, trapezoidal, spiral, etc., or no defined shape such as, for example, one or more spaced-apart projections or undulations (some other examples of embossments disclosed hereinafter). In some embodiments, structural properties of the embossments 34 can be aligned with respect to structural members of the plate 30 to act in a coordinated fashion, which can provide durability to the screen 18. In one example, a shape of the embossments 34 are rotated sixty degrees with respect to a shape of the plate 30. In other examples, the position(s) of the embossments 34 are not coordinated with the plate 30.

With rotation of the screen and cup assembly 10, the undulations of the embossments 34 appear to move up and down. The alternating action of these undulations can give action to knock debris away as the debris approaches the screen 18. With low channels toward each apex of the triangle, debris filtered by the screen 18 near the center is subject to centripetal forces which can act to push them radially away from the center of rotation, and the channels become the path for the exit of the debris. This action also may aid the ejection of debris which can otherwise clog the air passages 20. The embossment formed undulations 34 can be patterned to aid the ejection of debris gathered in the center, and/or provide stability to the screen 18 and avoid deformation from the connection points 32 with the cup 22. The screen 18 can also include a lip 19 bent around a perimeter of the screen 18 to provide further stiffness to the screen 18. The lip 19 can be angled downwardly from the screen 18. The screen 18 can include mounting holes 35 (see, e.g., FIG. 4) to accommodate bolts or other fasteners 27 to mount the screen 18 to the cup 22.

The screen and cup assembly 10 can be self-supported from the central connection of the cup 22 to the rotating crankshaft 16 and fan 12 of the engine 14. A shape and location of the embossments 34 can provide high dynamic stiffness, high centripetal stiffness, and/or high angular acceleration stiffness to help avoid fatigue damage induced by accelerations of the engine 14. The screen and cup assembly 10 can also aid in cooling the engine 14 by blocking and ejecting debris that may block cooling passages, while admitting the air used for the cooling action.

In some embodiments, the screen 18 of the screen and cup assembly 10 can be manufactured from a generally round, thin steel piece and formed to give an overall dome shape. The dome shape of the screen 18 provides an interior cavity or dome cavity underneath the dome or inside the dome. In other embodiments, other shapes can be used, including but not limited to oval, square, rectangular, unshaped, any arcuately-perimetered shape, any polygonal-perimetered shape, any combination of arcuately and polygonal perimetered shapes, etc. Moreover, in some embodiments, the screen 18 may be made of other materials including, but not limited to, aluminum, titanium, injection molded polymer, or any other material capable of withstanding the environment, forces, and application of the screen 18.

Figure 4:
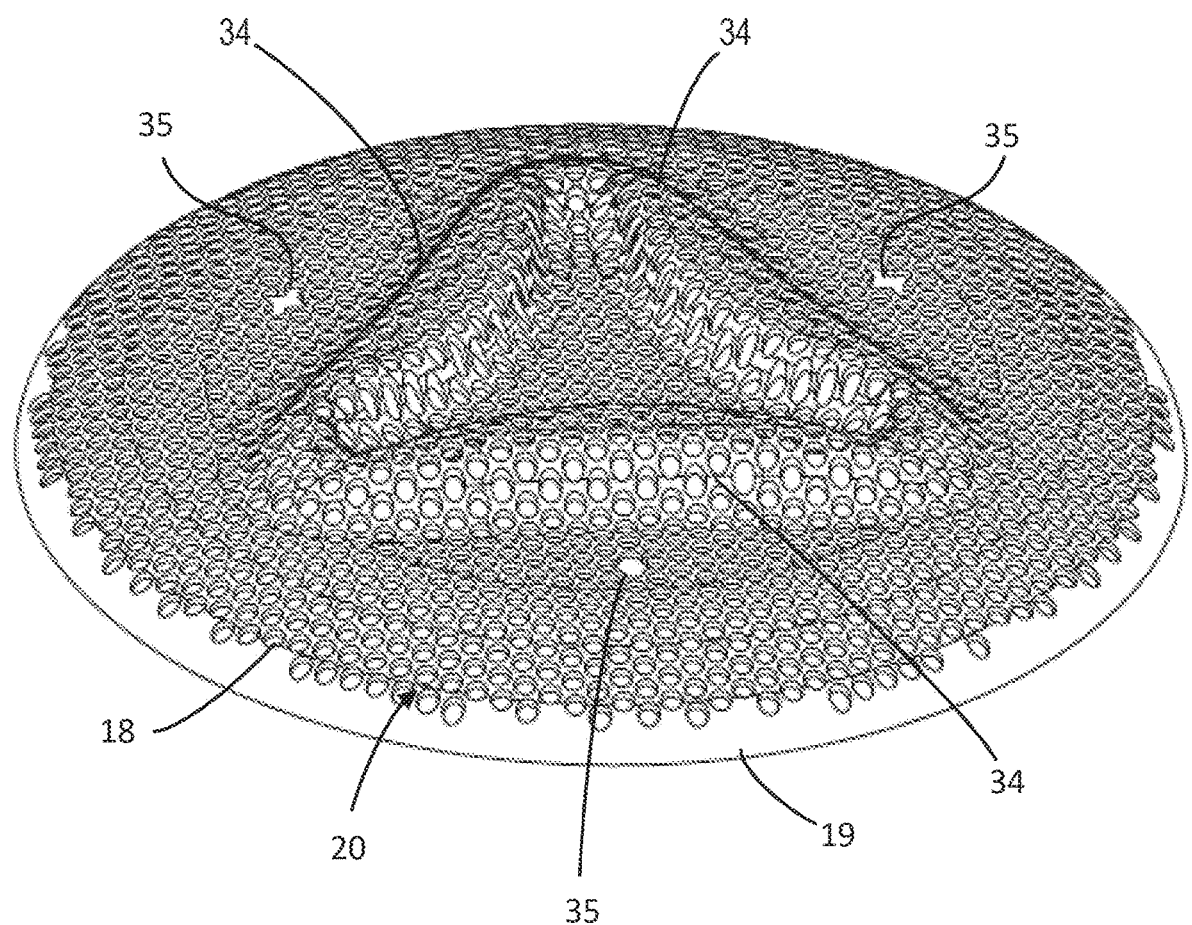
FIG. 4 is a top perspective view of the example screen.
Figure 5:
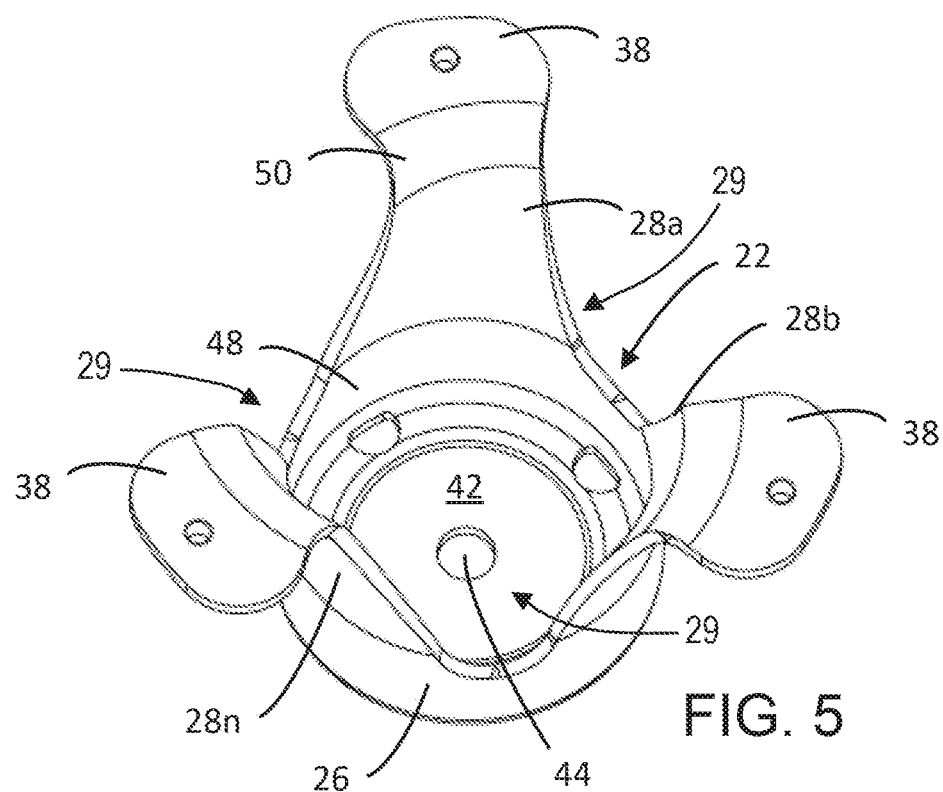
FIG. 5 is a side perspective view of the example cup.
Figure 6:
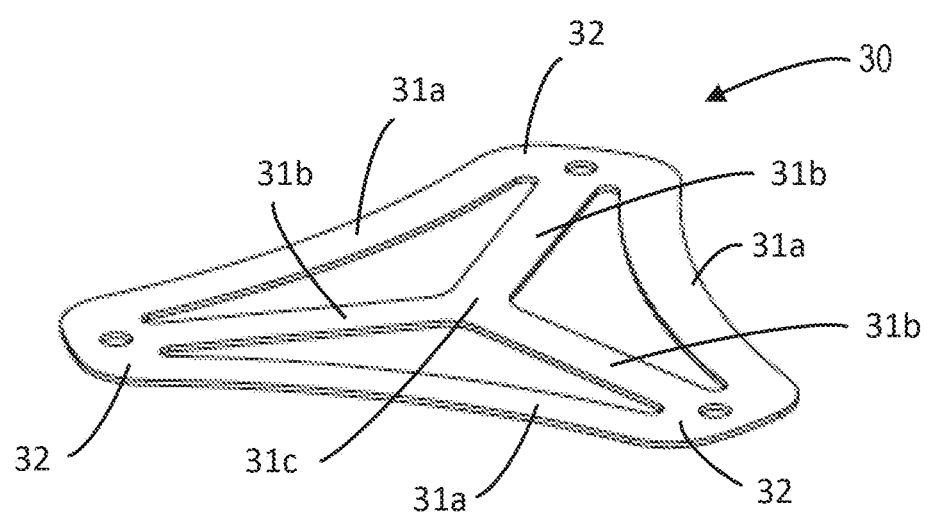
FIG. 6 is a side perspective view of the example plate.
Figure 7:
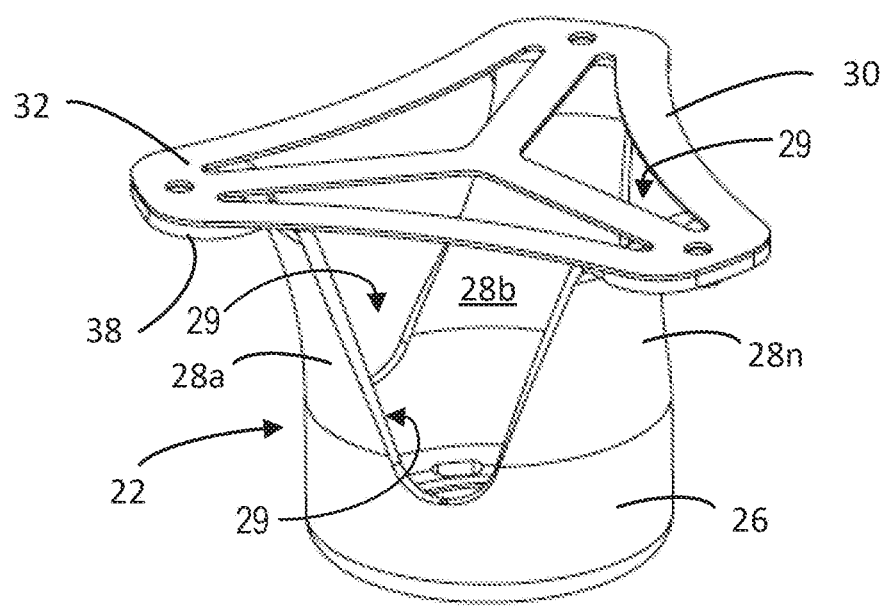
FIG. 7 is a side perspective view of the example plate mounted to the example cup.

Three formed embossments 34 can be positioned between the mounting holes 35 (see, e.g., FIG. 4). The dome shape of the screen 18 can increase the material section acting against planes of bending, thereby adding to the static and dynamic stiffness. The embossed shape 34 in the center can provide an increased vertical section to act against planes of bending, which further increases the dynamic stiffness of the screen 18. In some embodiments, a size of the embossed shape 34 is sufficiently large so that if a circle were to be drawn through each apex the diameter of the enclosed shape is more than about ⅔rds the diameter of the overall screen 18. This scaling of the embossments 34 to the overall diameter can be beneficial to the dynamic stiffness by inflating the section of the center of the screen 18, as well as the area covered by the embossed shape. In some embodiments, the embossed triangle is 60 degrees off-alignment with the triangular shape of the three mount locations of the cup 22, to provide stiffness in additional bending planes not covered by the cup 22, which can further aid the dynamic stiffness and resistance to fatigue. The selective placement of the embossments 34 can give the screen 18 the stiffness and mass distribution needed to have natural frequencies and dynamic stiffness which is higher than the most damaging harmonic vibration frequencies of the engine, as well as resistance to the centripetal forces and angular accelerations acting upon it, thereby protecting all components of the screen and cup assembly 10 assembly from fatigue damage. Therefore, the screen 18 may withstand the accelerations from the engine 14, e.g., to help avoid injury to nearby individuals and/or damage to surrounding components of the engine 14.

Moreover, when used, the plate 30 can provide an additional support structure to the screen 18. A generally triangular shaped plate 30 can include three outer bars 31a and one screw or other fastener mounting location at each of the three apex points 32 of the plate 30. The plate 30 can be attached to the screen 18 as a sub-assembly by being spot welded to the screen 18 at the center of each edge bar 31a, and at the center 31c of rotation. The outer bars 31a of material reaching from apex to apex provide stiffness to connect the legs 28a-n of the cup 22 to each other, thereby providing an aid to dynamic stiffness and resistance to centripetal forces and angular accelerations. The inner bars 31b of material reaching from each apex to the center 31c provide stiffness to connect the legs 28a-n of the cup 22 to the center of rotation, thereby helping to protect all members of the screen and cup assembly 10 from fatigue under centripetal forces.

Figure 8:
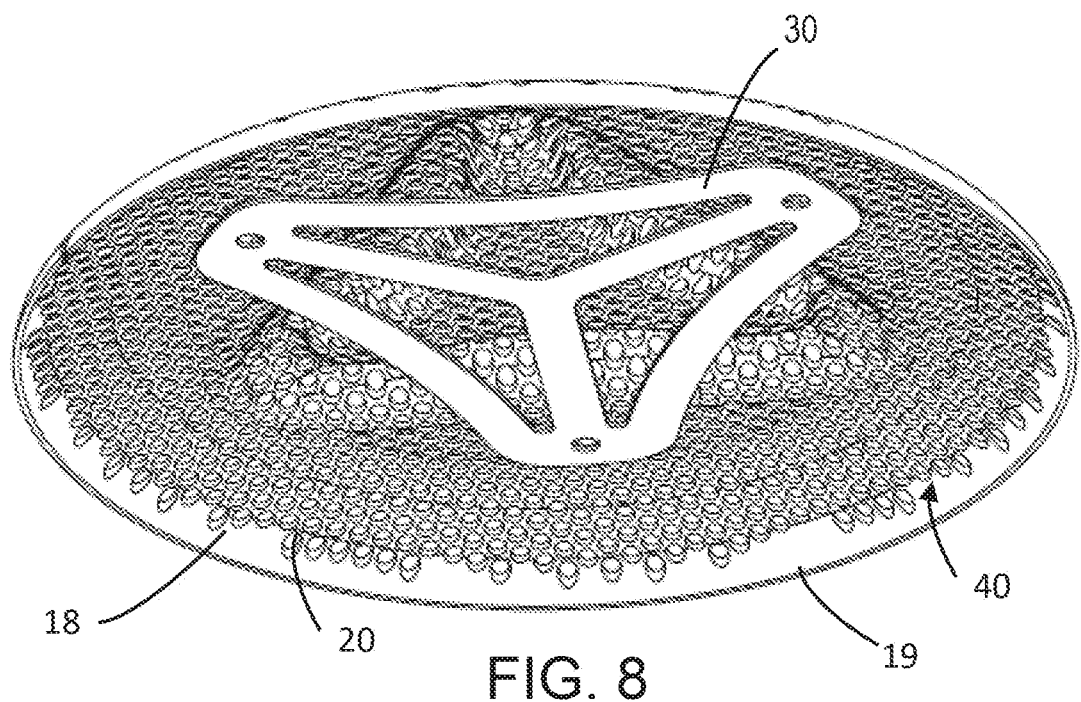
FIG. 8 is a bottom perspective view of the example plate mounted to the example screen.
Figure 9:
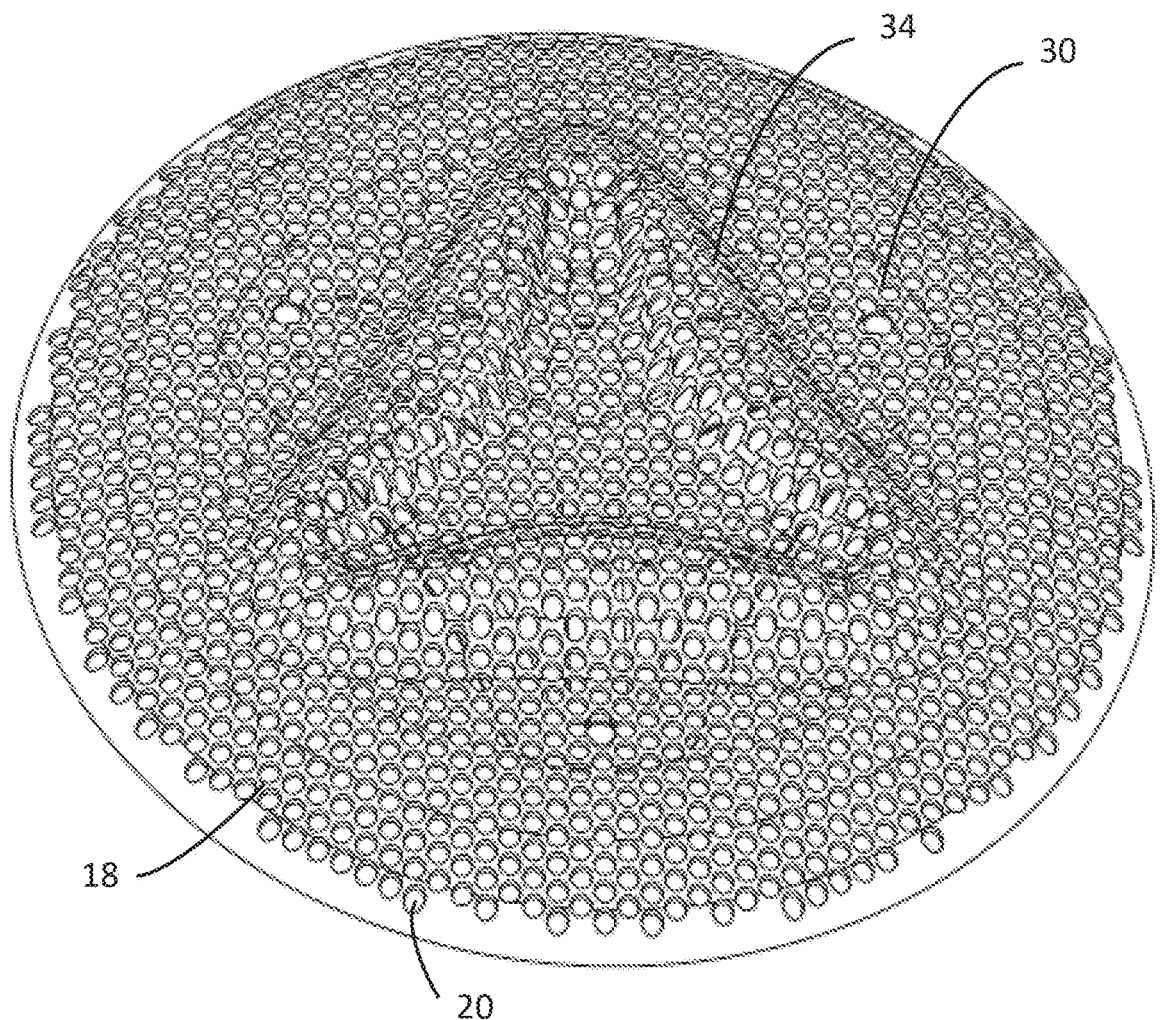
FIG. 9 is a top perspective view of the example plate mounted to the example screen.
Figure 10:
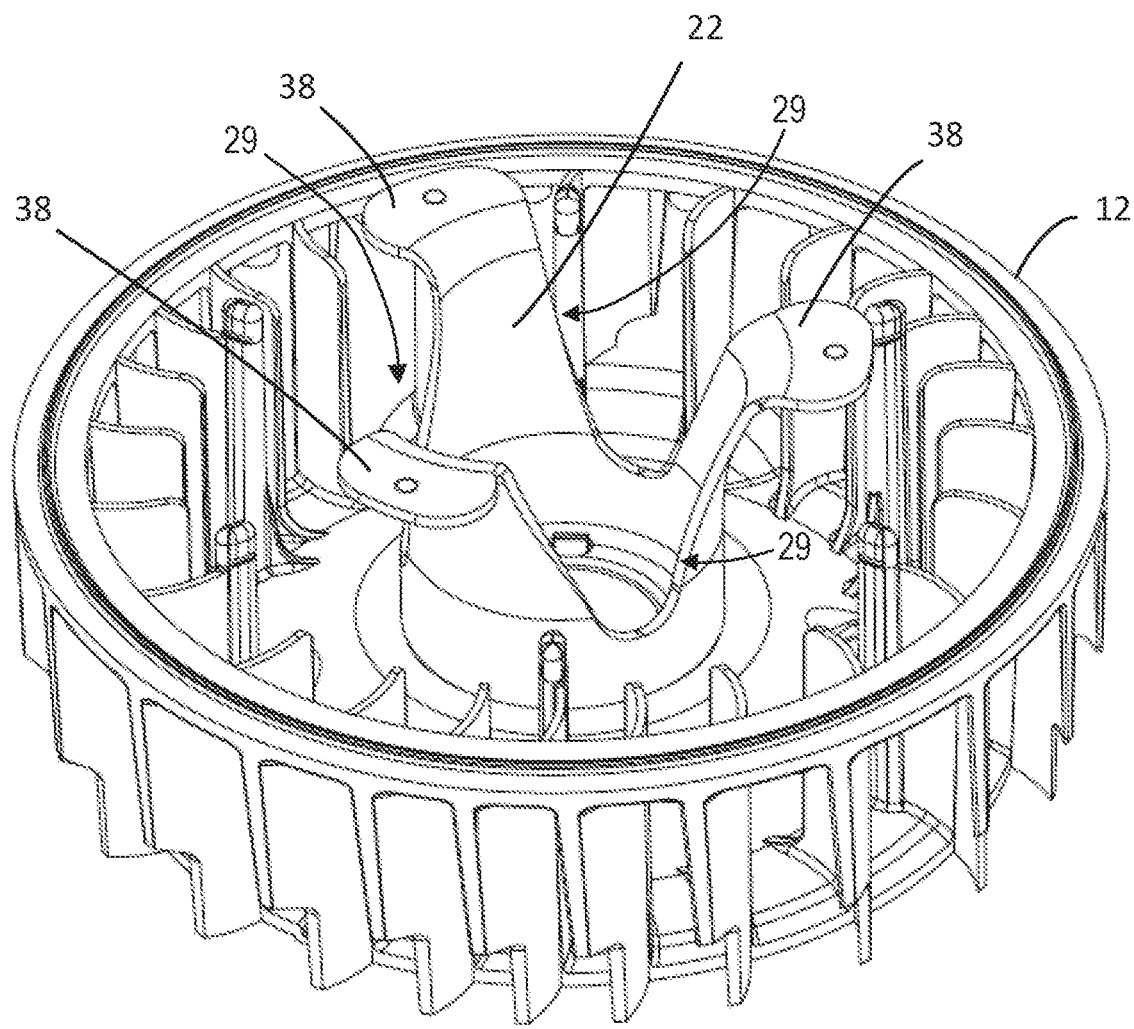
FIG. 10 is side perspective view of the example cup and an example fan.
Figure 16:
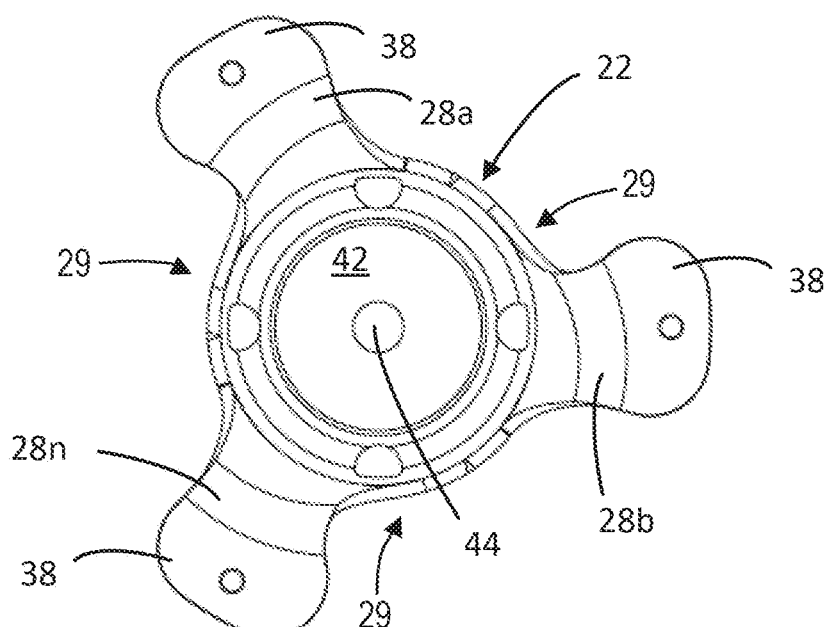
FIG. 16 is a top view of the example cup.
Figure 17:
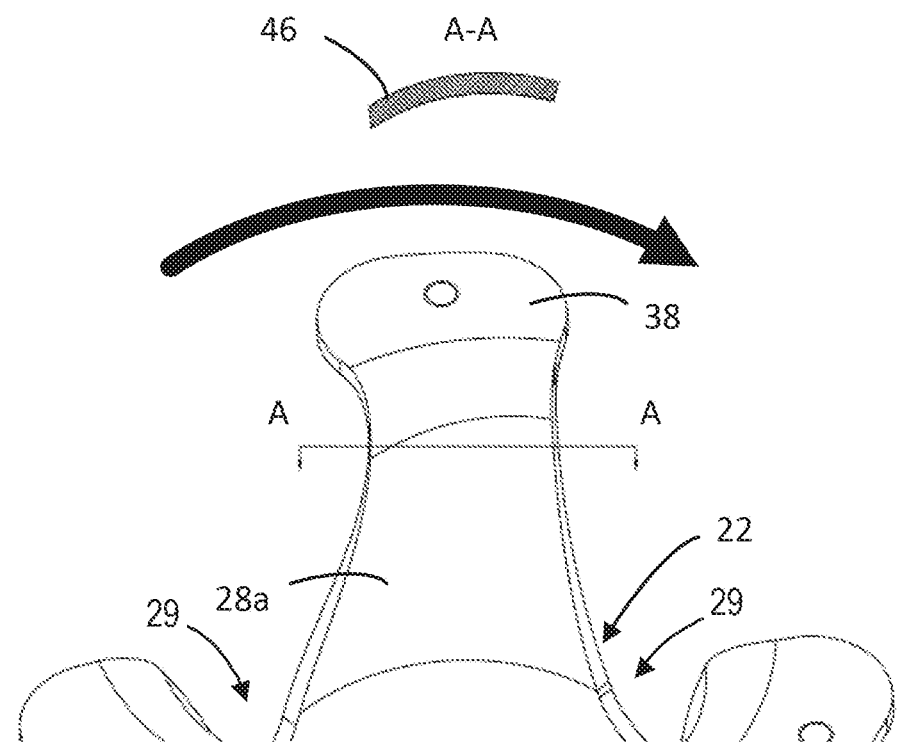
FIG. 17 is a partial top view of the example cup and an example leg shape.

Referring to FIGS. 16 and 17, the cup 22 with legs 28a-n can be manufactured from a thin steel sheet formed to include three sides. An example range for the thickness of the steel sheet to form the cup 22 is between 2.0-3.5 mm thick. Other thicknesses can be used. Ends of the sides of the legs 28a-n can be bent outwardly to form pads 38 to provide a flat surfaced platform to engage the plate 30 or a bottom surface 40 the screen 18 (FIG. 8). Each pad 38 of the legs 28a-n can include holes for lining up with holes in the points 32 of the plate 30, if a plate 30 is included, and holes in the screen 18. A bottom pad 42 of the cup 22 additionally includes a centered hole 44 for accommodating a fastener 24, e.g., a screw or bolt, etc., for mounting the screen and cup assembly 10 to the flywheel 13. Moreover, in some embodiments, three fasteners, e.g., screws or bolts, etc., can attach the screen 18 and the plate 30 to the legs 28*a-n* of the cup 22. If a screw is used the holes can be threaded. In other embodiments, any number of fasteners can be used to connect the screen 18 to the plate 30 and/or the cup 22.

A shape of the cup 22 can be drawn and formed upward from the bottom pad 42. The cylindrical end 26 of the cup 22 can include solid material all around the circumference which provides high stiffness to the mount. The legs 28*a-n* of the cup 22 can include both a conical and airfoil shape 46 (follows the upper boundary of the image in FIG. 17), which can give the legs 28*a-n* stiffness by increased section in planes of bending, and also give the legs 28*a-n* the ability to aid in inducting air flow into the cooling fan. The open areas 29 between the legs 28*a-n* can provide a benefit to the overall air flow of the fan 12 by allowing some of the air at the entrance of the fan to pass freely through the center during operation of the engine, thereby aiding cooling. A structure of the legs 28*a-n* can be larger at the bottom 48, and smaller at the top 50, which biases stronger structure towards the bottom 48, and reduced mass at the top 50 to add to the dynamic stiffness, providing protection from fatigue. The pads 38 of the legs 28*a-n* can include formed screw threads for attachment of the screen 18. The pads 38 can be shaped to support more of the screen 18 than just the area within the bolted joint of the screw, thereby providing additional protection from fatigue. A pattern of the pads 38 of the legs 28*a-n* can form a virtual triangle. In some embodiments, the triangle is sized to be larger than ⅔rds the diameter of the screen 18, which provides a secure grasp of the screen mass with a minimum of cantilever suspension, giving dynamic stiffness to the screen 18.

Figure 18:
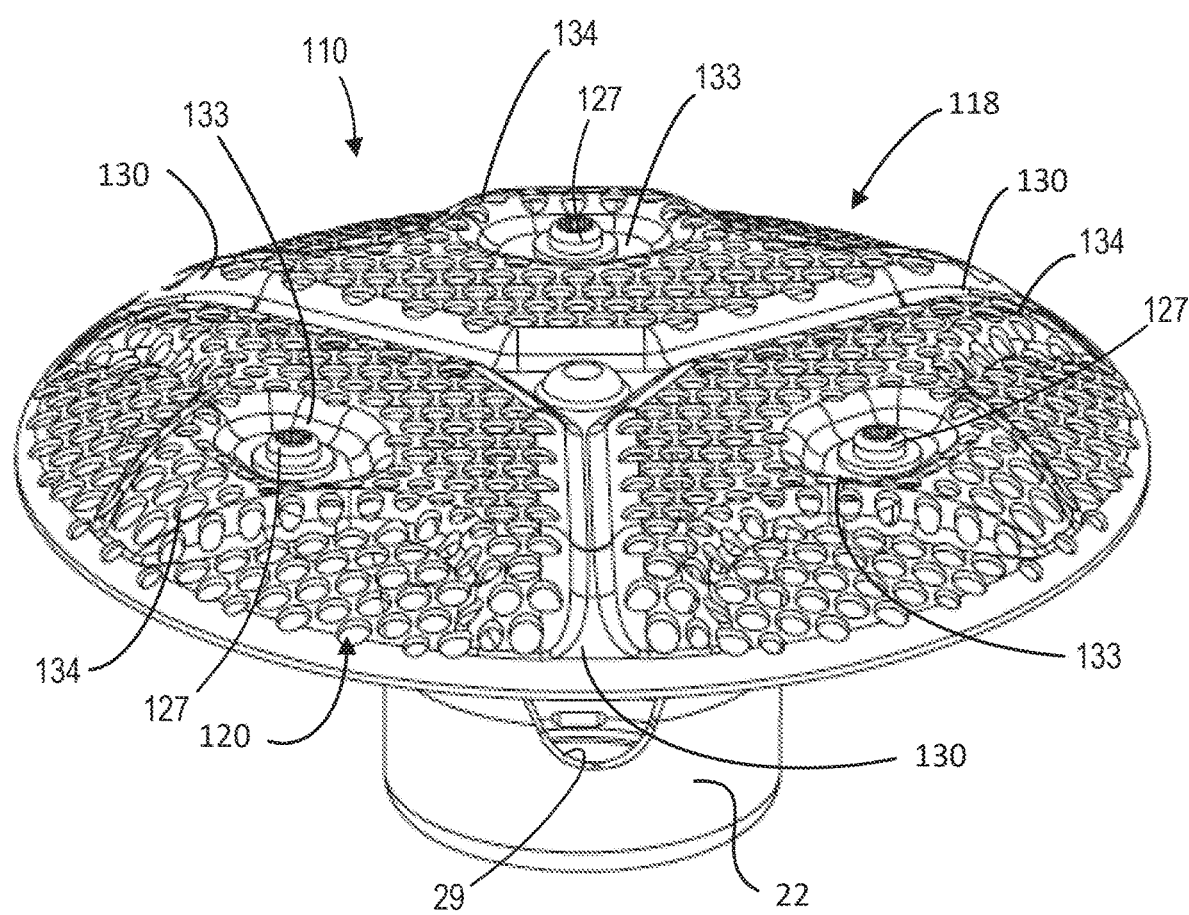
FIG. 18 is a top perspective view of an example of an alternate screen connected to the example cup.
Figure 19:
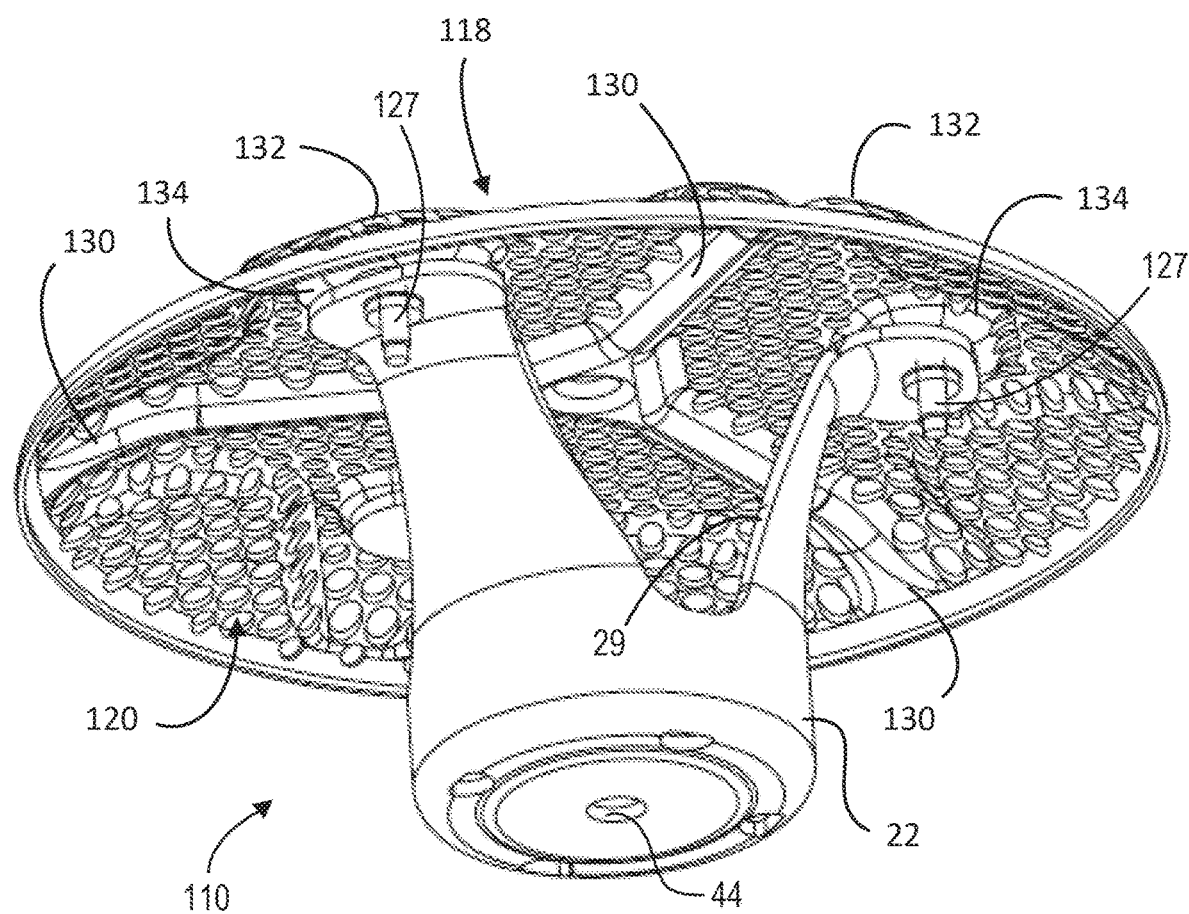
FIG. 19 is a bottom perspective view of the example of the alternate screen connected to the example cup.
Figure 20:
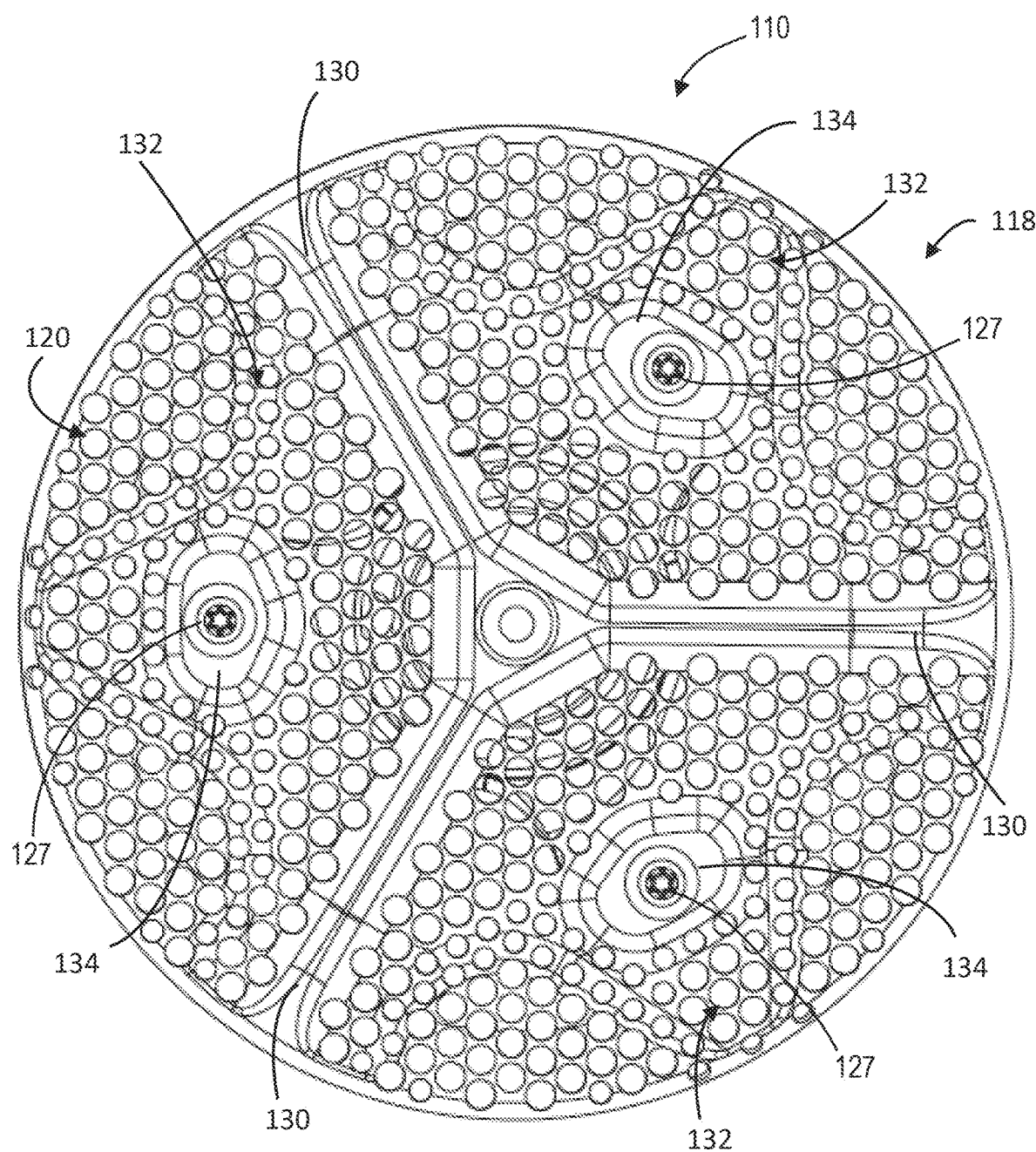
FIG. 20 is a top view of the example of the alternative screen.

Referring to FIGS. 18-20, another example of a screen and cup assembly 110 is illustrated. In this example of the assembly 110, the cup 22 can directly mount with another example of a screen 118 using a plurality of fasteners 127. In the illustrated embodiment, the screen 118 is coupled to the cup 22 with three fasteners. In other embodiments, the screen 118 may be coupled to the cup 22 with any number of fasteners The screen 118 can include integrated support bars 130 which meet in the center and/or embossments 134 positioned between the support bars 130, creating stiffening features across many different planes of bending of the screen 118, to provide high dynamic stiffness, high centripetal stiffness, and/or high angular acceleration stiffness to avoid fatigue damage induced by accelerations of the engine 14. In some embodiments, the support bars 130 and the embossments 134 are not aligned with each other, creating a matrix of stiffening features across many different planes of bending, to provide high dynamic stiffness and resistance to fatigue. The screen 118 can also include generally flat surfaces or pads 133 that align with the pads 38 of the cup 22 for mounting the cup 22 to the screen 118. In the illustrated example, the pads 133 are defined in the screen 218 within boundaries of the embossments 134. Other variations of support bars, embossments, pads, etc., are possible, e.g., depending on an implementation. In some embodiments, the location of air passage holes 120 can be chosen to aid the dynamic stiffness of the screen 118, thereby protecting the screen 118 from fatigue. The air passage holes 120 can be placed in locations to reduce the localized mass, or the air passage holes 120 can be omitted from locations to increase localized stiffness.

Figure 21:
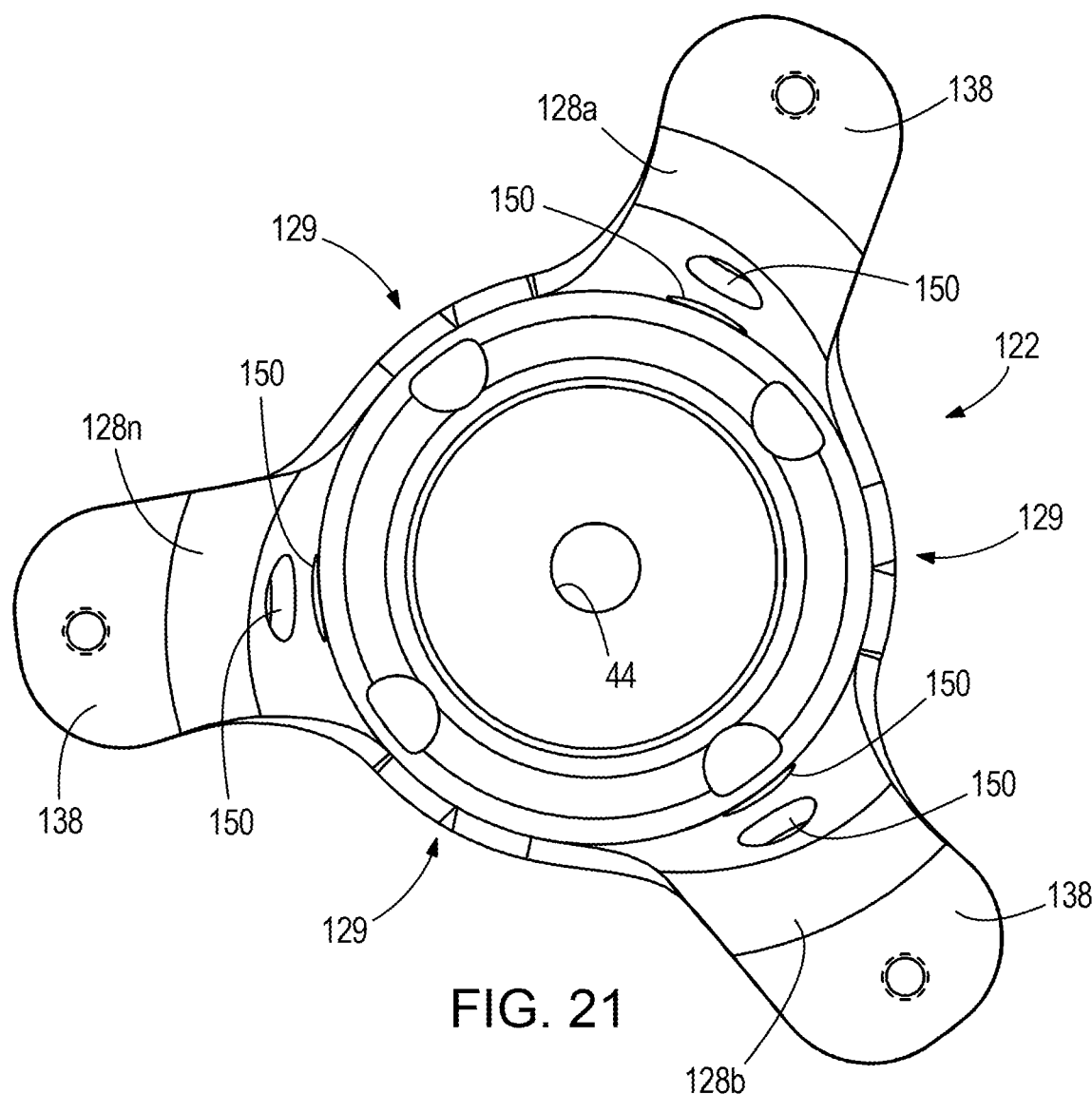
FIG. 21 is a top view of another example cup.
Figure 22:
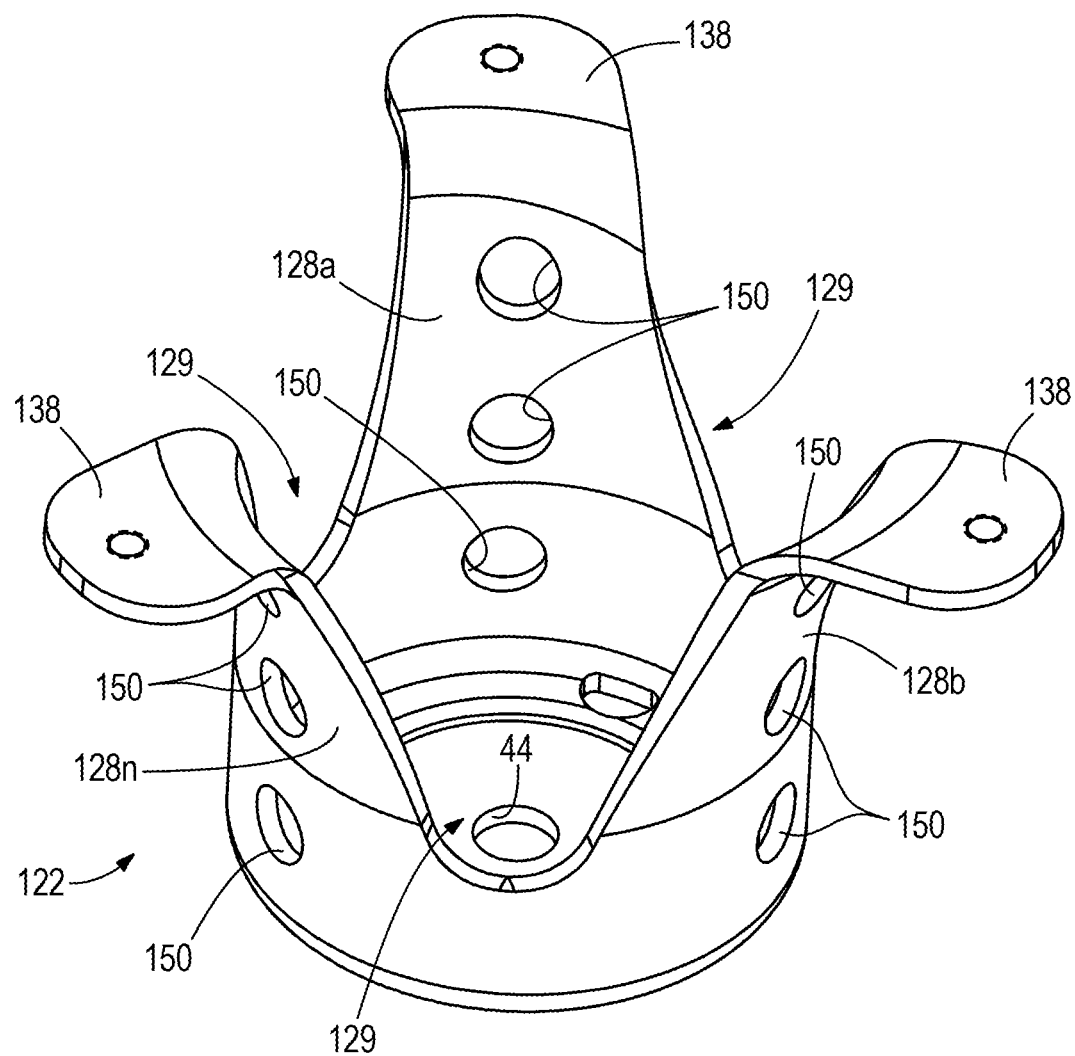
FIG. 22 is a top perspective view of the example cup shown in FIG. 21.
Figure 23:
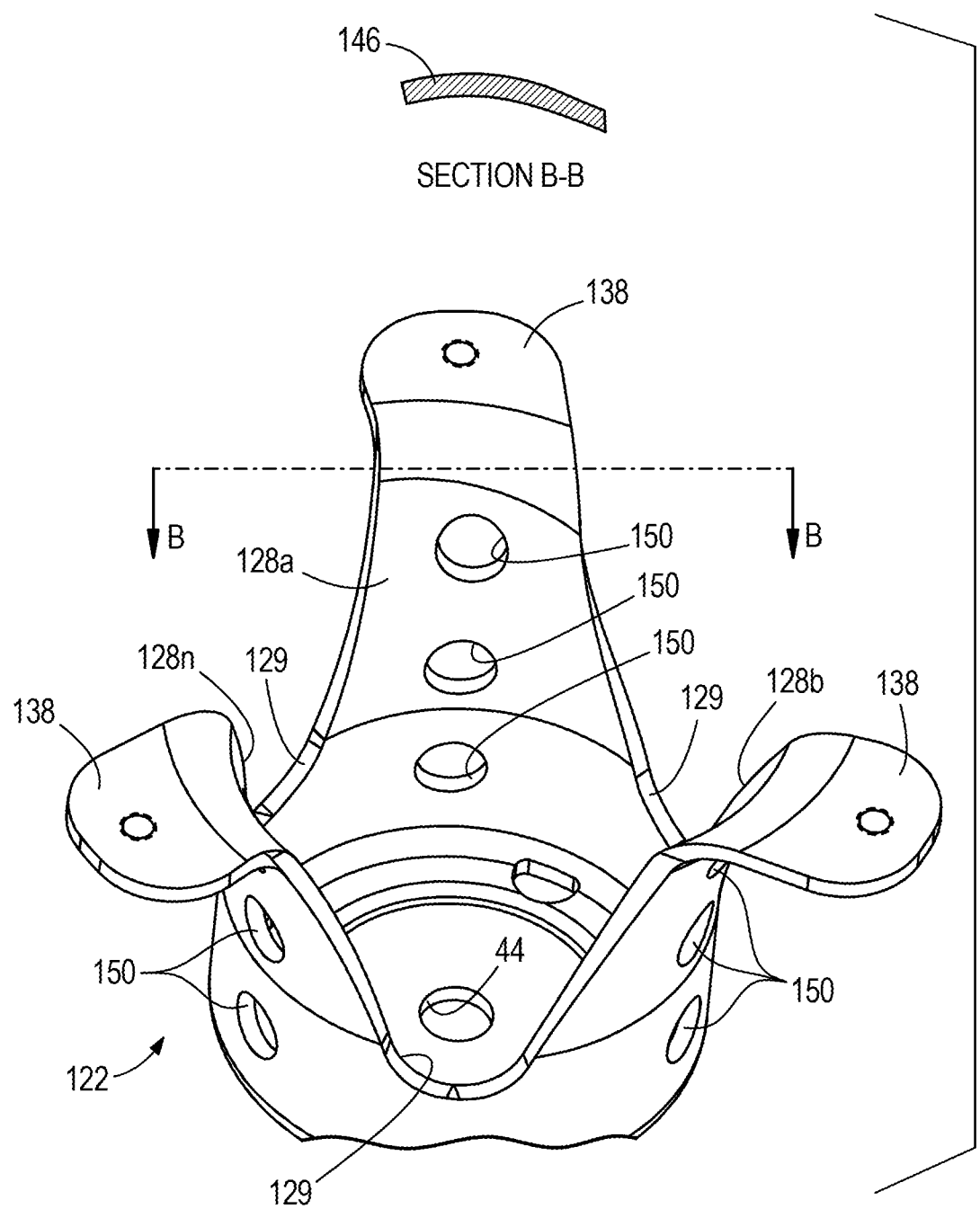
FIG. 23 is a top perspective view of the example cup shown in FIG. 21 with a cross-section view along line B-B.

Referring now to FIGS. 21-23, another example of a cup 122 is illustrated. In this example, the cup 122 includes pads 138 smaller in size than pads 38 included in the example cup 22 illustrated in FIGS. 1-20. The smaller size of the pads 138 illustrated in FIGS. 21-23 result in lower mass, thereby reducing stress and fatigue from angular velocity loads/forces. Additionally, reduction in size of the pads 138 results in reduction of material and manufacturing costs. The cup 122 also defines a plurality of holes 150 in legs 128*a-n* of the cup 122. In the illustrated embodiment, each leg 128*a-n* includes three holes 150. In other embodiments, the legs 128*a-n* are capable of defining any number of holes 150 therein. In further embodiments, the legs 128*a-n* may all include the same number of holes 150 therein or the legs 28*a-n* may include different number of holes 150 relative to each other. The holes 150 defined in the legs 128*a-n* reduce the mass of the cup, thereby reducing stress and fatigue from angular velocity loads/forces. Moreover, the holes 150 assist air flow through the legs 128*a-n* of the cup 122 and toward the fan 12 to assist with cooling of the engine 14. In the illustrated embodiment, the holes 150 are generally round in shape. In other embodiments, the holes 150 may have different shapes including, but not limited to, any polygonal perimetered shape, any arcuately perimetered shape, any combination of partially polygonal and partially arcuately perimetered shape, etc. In still other embodiments, the holes 150 may have any size.

With continued reference to FIG. 23, the legs 128*a-n* of the cup 122 can include both a conical and airfoil shape 146. In this illustrated example, the airfoil shape 146 of the legs 128*a-n* is opposite the airfoil shape 46 of the cup 22 illustrated in FIG. 17. This airfoil shape 146 provides the legs 128*a-n* with stiffness by increased section in planes of bending, and also provides the legs 128*a-n* with the ability to aid in inducting air flow into the cooling fan 12. The open areas 129 between the legs 128*a-n* can provide a benefit to the overall air flow of the fan 12 by allowing some of the air at the entrance of the fan 12 to pass freely through the center during operation of the engine 14, thereby aiding cooling.

Figure 24:
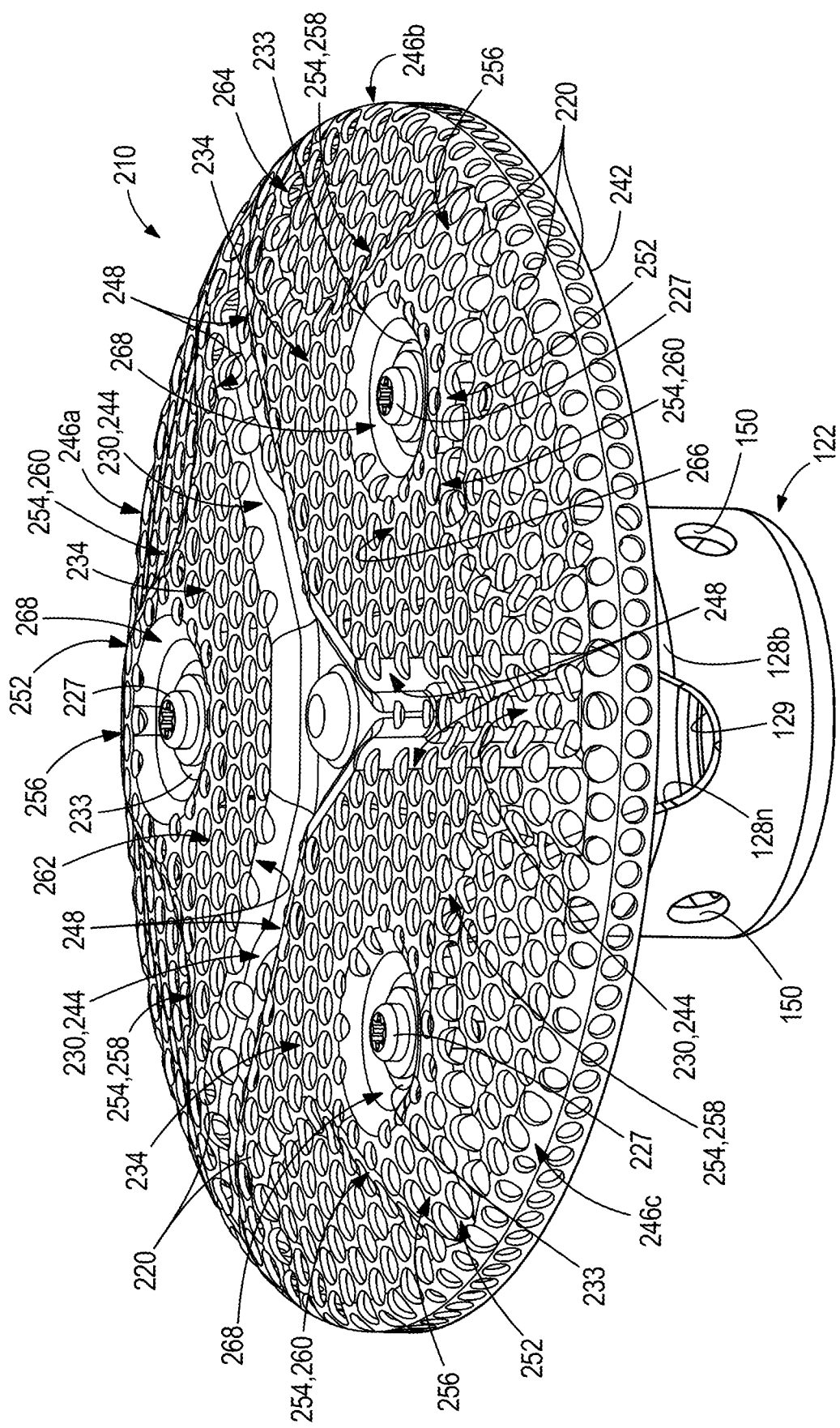
FIG. 24 is a top perspective view of another example screen and cup assembly including another example screen and the example cup shown in FIG. 21.
Figure 25:
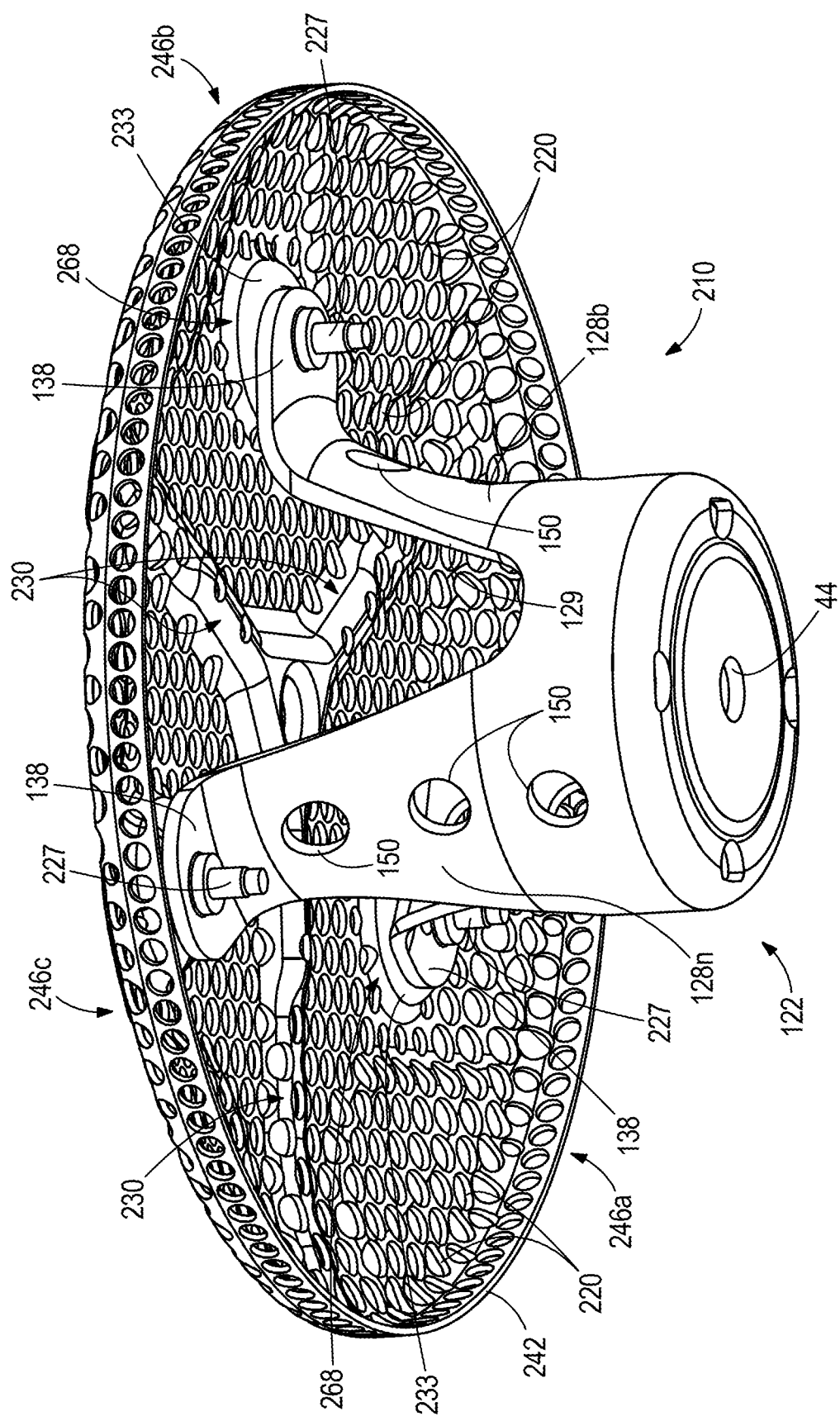
FIG. 25 is a bottom perspective view of the example screen and cup assembly shown in FIG. 24.
Figure 26:
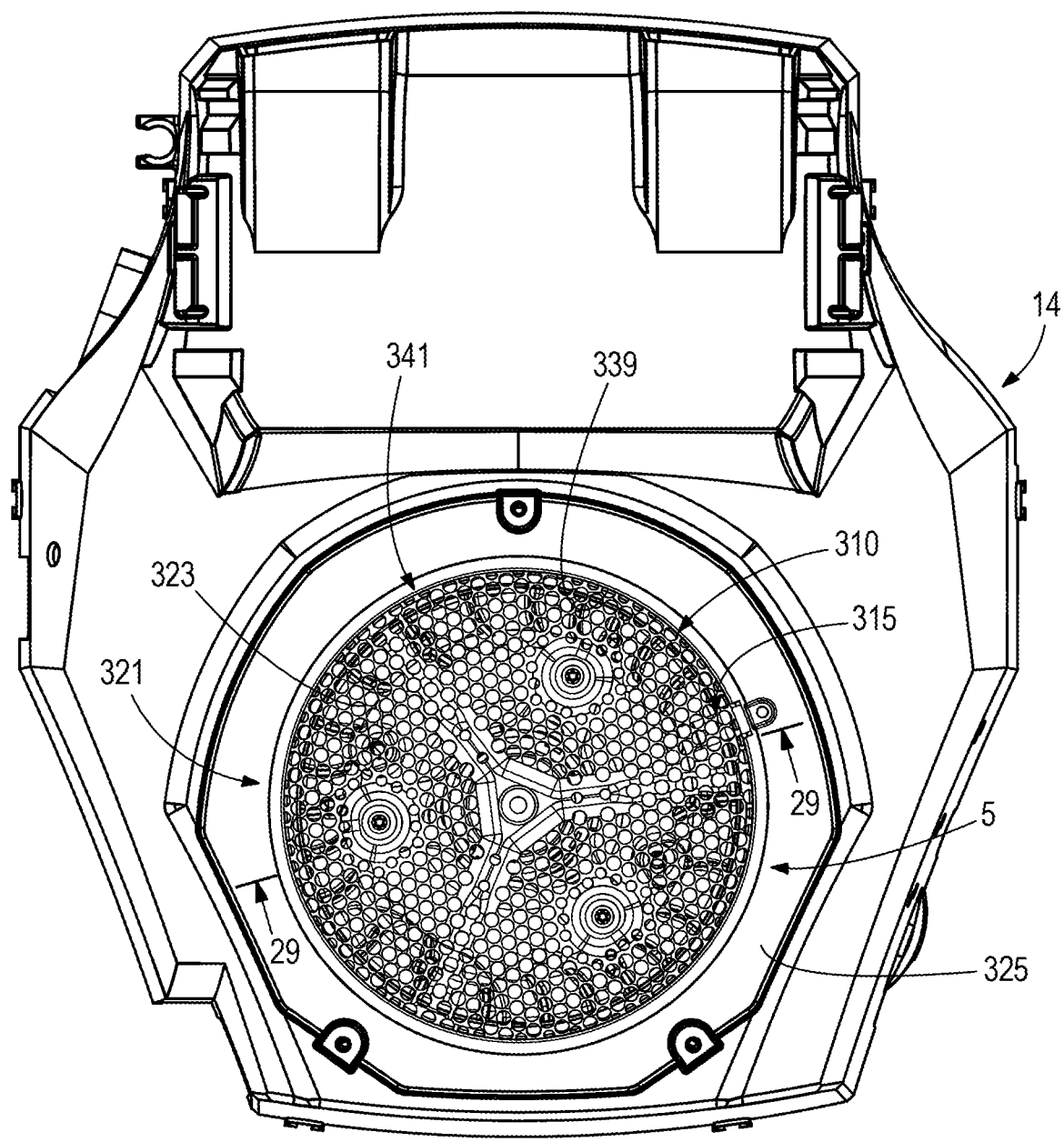
FIG. 26 is a top view of another example of a screen and cup assembly useable with an example engine, with the screen and cup assembly including an example screen clearing member.
Figure 27:
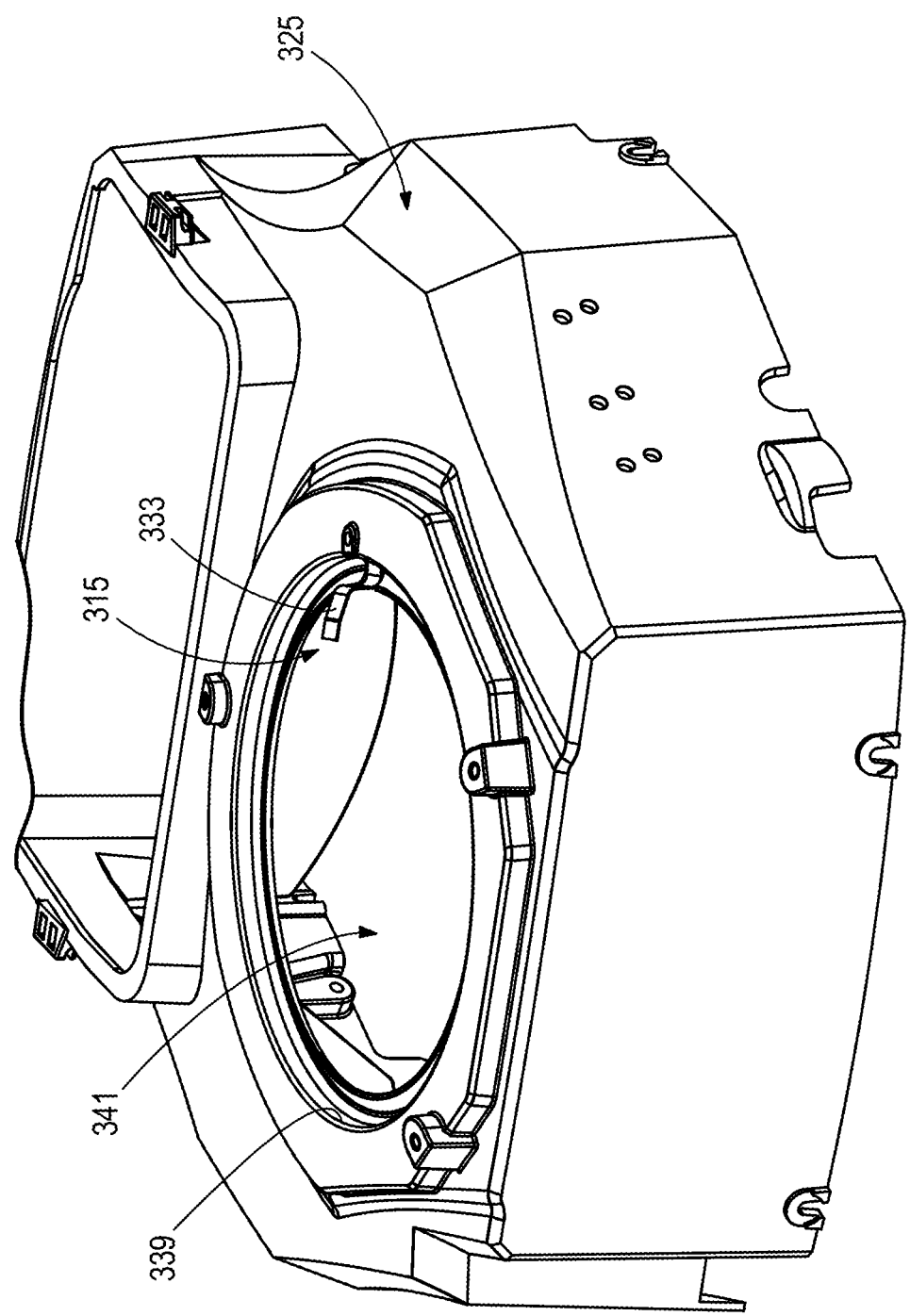
FIG. 27 is a top perspective view of a portion of the example engine with the example screen removed to show the example screen clearing member.
Figure 28:
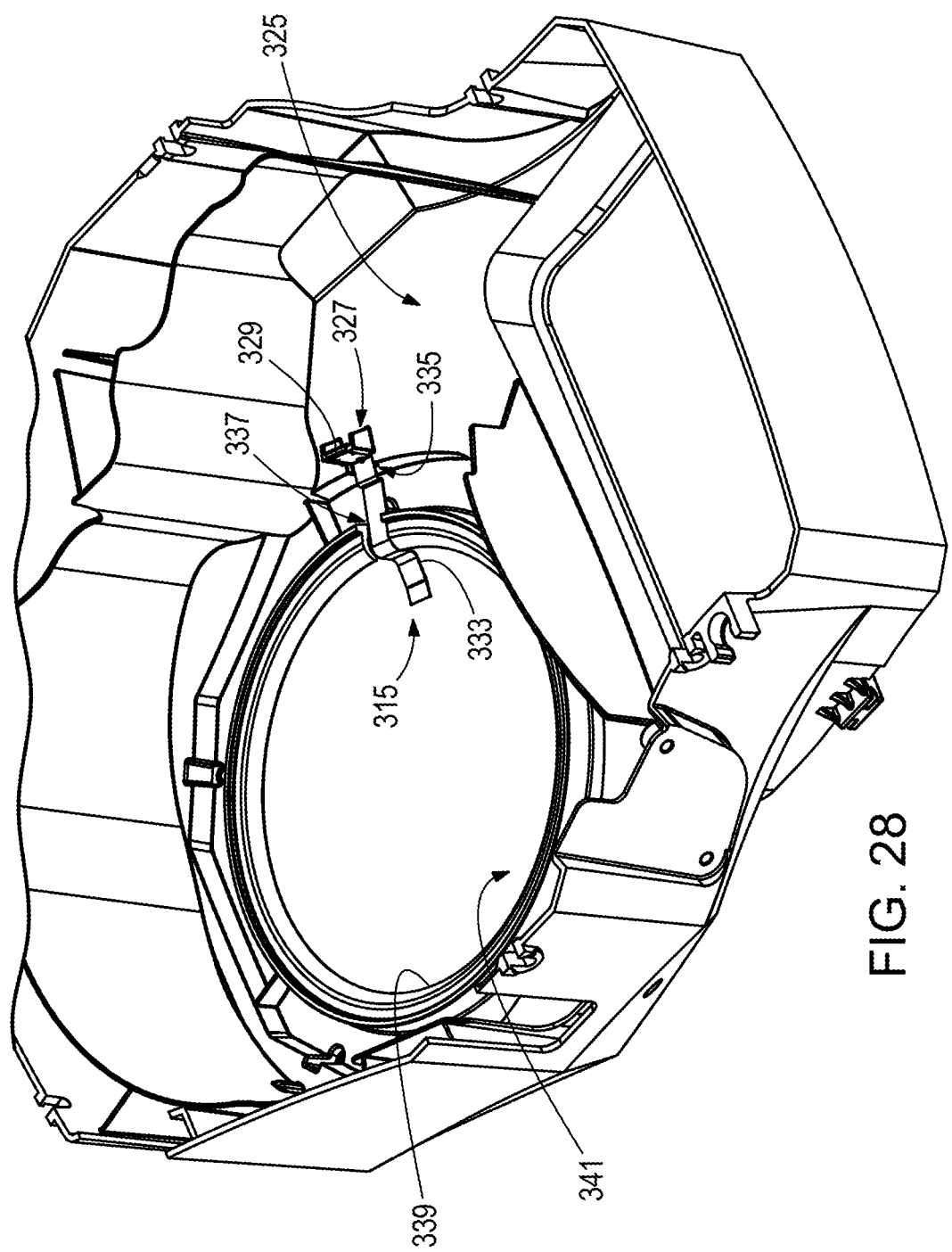
FIG. 28 is a bottom perspective view of a portion of the example engine showing the example screen clearing member.

With reference to FIGS. 24 and 25, another example of a screen and cup assembly 210 is illustrated. In this example, the cup 122 can directly mount with another example screen 218 with a plurality of fasteners 227. In the illustrated embodiment, the screen 218 is coupled to the cup 122 with three fasteners 227. In other embodiments, the screen 218 may be coupled to the cup 122 with any number of fasteners. The screen 218 can include integrated support bars 230 which meet in the center and/or embossments 234 positioned between the support bars 230, creating stiffening features across many different planes of bending of the screen 218, to provide high dynamic stiffness, high centripetal stiffness, and/or high angular acceleration stiffness to avoid fatigue damage induced by accelerations of the engine 14. In some embodiments, the support bars 230 and the embossments 234 are not aligned with each other, creating a matrix of stiffening features across many different planes of bending, to provide high dynamic stiffness and resistance to fatigue. The screen 218 can also include generally flat surfaces or pads 233 that align with the pads 138 of the cup 122 for mounting the cup 122 to the screen 218. Other variations of support bars, embossments, pads, etc., are possible, e.g., depending on an implementation.

In some embodiments, the location of air passage holes 220 can be chosen to aid the dynamic stiffness of the screen 218, thereby protecting the screen 218 from fatigue. The air passage holes 220 can be placed in locations to reduce the localized mass, or the air passage holes 220 can be omitted from locations to increase localized stiffness. In the illustrated embodiment, the air passage holes 220 are defined extensively throughout the screen 218, including the support bars 230. The screen 218 also includes a rim or lip 242 defining a periphery of the screen 218. In the illustrated embodiment, the air passage holes 220 are defined in the rim 242 of the screen 218. The additional air passage holes 220 in the rim 242 assist with air flow through the screen 218 and into the engine 14. Moreover, the additional air passage holes 220 in the rim 242 reduce the mass of the screen 218, thereby reducing stress and fatigue from angular velocity loads/forces.

With continued reference to FIGS. 24 and 25, the screen 218 can include a plurality of formed shapes (e.g., embossments 234) and/or a plurality of structural members, depending on an implementation, to move debris away from the screen 218 and/or provide the screen 218 with dynamic stiffness and resistance to the forces that can cause fatigue to the screen 218. In the illustrated embodiment, the support bars 230 define channels or depressions 244 to divide or separate the screen 218 into three generally equal portions 246a, 246b, 246c. In one example, the screen 218 could be considered to have three embossments 234. In the illustrated embodiment, for the sake of description, each of the three embossments 234 includes two interior edges 248 and one exterior edge 252. The two interior edges 248 are generally straight and the exterior edge 252 is generally arcuate or undulating. The interior edges 248 of each embossment 234 are defined by the channels 244. In the illustrated embodiment, the exterior edge 252 comprises a pair of convex portions 254 separated by a protrusion 256 in the embossment 234. In an alternative manner of describing each embossment 234, the exterior edge 252 of each embossment 234 includes a first recess 258, a protrusion 256, and a second recess 260 on an opposite side of the protrusion 256 from the first recess 258. A top surface 262 of the screen 218 undulates between a first, lower level 264 and a second, upper level 266 higher in profile than the lower level 264. The first, lower level 264 of the top surface 262 is located at the convex portions 254 or recesses 258, 260 associated with the exterior edges 252 of the embossments 234. The top surface 262 of the screen 218 transitions smoothly and gradually from the first, lower level 264 to the second, upper level 266 to define the exterior edges 252 of the embossments 234. Each embossment 234 also includes a depression 268 therein or within the boundary thereof to provide the flat surface 233 against which the fastener can engage to couple the screen 218 to the cup 122. In other examples, the embossments 234 of the screen 218 can have a wide variety of shapes, sizes and configurations. Moreover, the screen 218 is capable of including any number of embossments 234.

With reference to FIGS. 26-30, another example of a screen and cup assembly 310 for an engine 14 is illustrated. In this example, the screen and cup assembly 310 includes a screen clearing member 315 that assists with removing debris from the screen 218 and/or inhibiting debris from accumulating on the screen 218. The screen clearing member 315 is positioned on an interior 317 of the screen 218 and in close proximity to an interior surface 319 of the screen 218. In the illustrated embodiment, the screen clearing member 315 is spaced-apart from the interior surface 319 of the screen 218 and does not contact or engage the screen 218. In one example, the screen clearing member 315 is no more than 3 millimeters (mm) away from the interior surface 319 of the screen 218. In another example, the screen clearing member 315 is between 1 millimeter (mm) and 3 millimeters (mm) from the interior surface 319 of the screen 218. In a further example, the screen clearing member 315 is between about 0.5 millimeters (mm) and about 20 millimeters (mm) from the interior surface 319 of the screen 218.

In other embodiments, the screen clearing member 315 may contact or engage the interior surface 319 of the screen 218. In still other embodiments, the screen clearing member 315 may be positioned on an exterior 321 of the screen 218 and be positioned in close proximity to an exterior surface 323 of the screen 218.

With continued reference to FIGS. 26-30, the screen clearing member 315 is fixed relative to the screen 218 such that the screen 218 rotates relative to the screen clearing member 315. In the illustrated embodiment, the screen clearing member 315 is coupled to a blower housing 325 of the engine 14. The blower housing 325 includes a tab or projection 327 extending into an interior of the blower housing 325. The blower housing 325 does not rotate. Thus, by coupling the screen clearing member 315 in a fixed manner to the blower housing 325, the screen clearing member 315 also does not rotate. In the illustrated embodiment, the screen clearing member 315 is friction-fit, interference-fit, and/or press-fit to the blower housing 325. The screen clearing member 315 is made of a resilient material such as, for example, metal, steel, plastic, etc., and includes a coupling portion 329 that is deformed to insert over the projection 327 of the blower housing 325. The deformation of the resilient coupling portion 329 exerts a pressure or force onto the projection 327 of the blower housing 325 as the coupling portion 329 attempts to return to its non-deformed state. The coupling portion 329 also includes a plurality of projections or teeth 331 configured to engage the projection 327 of the blower housing 325. The teeth 331 dig into the projection 327 and/or apply the pressure or force of the resilient coupling portion 329 to a smaller surface area (i.e., tips of the teeth 331), thereby increasing the engagement between the coupling portion 329 and the projection 327 of the blower housing 325, all of which assist with securing the screen clearing member 315 to the blower housing 325. In the illustrated embodiment, the screen clearing member 315 includes four teeth 331. Alternatively, the screen clearing member 315 may include any number of teeth 331 (including zero). In other embodiments, the screen clearing member 315 may be coupled to other components of the engine 14. In such embodiments, the screen clearing member 315 would still be fixed and the screen 218 would rotate relative to the screen clearing member 315. In further embodiments, the screen clearing member 315 may be coupled to the engine 14 in any of a wide variety of manners including, but not limited to, fastened, welded, unitarily-formed as one-piece with the engine 14, or any other manner to provide a secure coupling.

Referring further to FIGS. 26-30, the screen clearing member 315 is supported in numerous locations by the blower housing 325. First, the screen clearing member 315 is rigidly coupled to the projection 327 of the blower housing 325. Additionally, a top surface 333 of the screen clearing member 315 engages the blower housing 325 in numerous locations to provide support to the screen clearing member 315. A first location 335 of engagement between the screen clearing member 315 and the blower housing 325 is adjacent the projection 327 of the blower housing 325. A second location 337 of engagement between the screen clearing member 315 and the blower housing 325 is at an edge or lip 339 of the blower housing 325 defining a screen opening 341 in the blower housing 325. The edge 339 of the blower housing 325 engages the top surface 333 of the screen clearing member 315. In some embodiments, the screen clearing member 315 has a resiliency and, when connected to the projection 327 of the blower housing 325, the screen clearing member 315 may be slightly deformed from its natural state of rest, thereby applying a resiliency force to the edge 339 of the blower housing 325. This resiliency force may assist with supporting the screen clearing member 315 in position and withstanding forces applied to the screen clearing member 315 by debris.

The screen clearing member 315 extends through the gap 11 provided between the screen 218 and the fan 12 to position the screen clearing member 315 adjacent the interior surface 319 of the screen 218. In some conventional screen assemblies, a screen may engage a top of the fan, thereby eliminating a gap between the screen and the fan. Such elimination of a gap between a screen and a fan would prevent a screen clearing member from accessing an interior of the screen. Returning to the illustrated embodiment, the screen clearing member 315 is capable of having a wide variety of shapes, sizes, configuration, etc., in order to assist with clearing debris from the screen 218. In the illustrated embodiment, the screen clearing member 315 is complementarily shaped to the shape of the screen 218. As indicated above, the screen is capable of having a wide variety of shapes, sizes, configurations, etc. The screen clearing member 315 is capable of having any size, shape, configuration, etc., in order to be complementary to the screen and clear debris therefrom.

In operation, the screen 218, the fan 12, the flywheel 13 and the crankshaft 16 all rotate together relative to the blower housing 325 and the screen clearing member 315. During operation, debris may be pulled or sucked into the screen 218 through the air passage holes 220. In some cases, debris may become lodged in the air passage holes 220, or debris may begin to accumulate in the air passage holes 220 or on the interior surface 319 of the screen 218. In such instances, the debris will rotate with the screen 218 and may contact the screen clearing member 315, in which case the screen clearing member 315 will dislodge the debris from the air passage holes 220 or the interior surface 319 of the screen 218 and the debris will move away from the screen 218. The presence of the screen clearing member 315 in close proximity to the interior surface 319 of the screen 218 may also create air turbulence adjacent the interior surface 319 of the screen 218. This air turbulence helps inhibit debris from becoming lodged in the air passage holes 220 and/or accumulating on the interior surface 319 of the screen 218. In other words, the screen clearing member 315 clears debris from the screen 218 and inhibits debris from becoming lodged in the air passage holes 220 or accumulating on the interior surface 319 of the screen 218.

It should be understood that any components, structures and functionalities (and alternatives and equivalents thereof) of any of the embodiments disclosed herein are capable of being used and/or combined in any manner with any components, structures and functionalities (and alternatives and equivalents thereof) of any other embodiments disclosed herein. For example, the screen clearing member 315 shown with respect to the embodiment illustrated in FIGS. 26-30 may be used with any screen and cup assemblies of any of the other embodiments shown in FIGS. 1-25.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it is appreciated that different combinations of elements and/or functions may be provided by alternative embodiments without departing from the scope of the disclosure and the appended claims.

Many modifications and other embodiments set forth herein will come to mind to one skilled in the art having the benefit of the teachings presented in the foregoing descriptions and the associated drawings. Although specific terms are employed herein, they are used in a generic and descriptive sense only and not for purposes of limitation.

The invention claimed is:

1. An air intake assembly for an engine, the air intake assembly comprising:
   a screen defining a plurality of air passage holes therein configured to allow passage of air through the screen and into the engine;
   a fan;
   a flywheel;
   a crankshaft; and
   a screen support member coupled to the screen, wherein the fan, the flywheel and the screen support member are coupled to the crankshaft with a single fastener, wherein the screen, the fan, the flywheel, the crankshaft and the screen support member all rotate together when coupled to the crankshaft with the single fastener;
   wherein the screen support member includes a plurality of spaced-apart legs extending from the base, and wherein the screen is coupled to each of the plurality of spaced-apart legs with a fastener.

2. The air intake assembly of claim 1, wherein the fan is compressed between the screen support member and the flywheel when coupled together with the single fastener.

3. The air intake assembly of claim 1, wherein the crankshaft defines a threaded aperture and the single fastener is a single threaded fastener, and wherein the single threaded fastener passes through the fan and the flywheel without threading thereto and threadably engages the threaded aperture of the crankshaft.

4. The air intake assembly of claim 3, wherein the fan is compressed between the screen support member and the flywheel when coupled together with the single threaded fastener.

5. The air intake assembly of claim 1, wherein the screen is coupled to the screen support member in a plurality of locations.

6. The air intake assembly of claim 5, wherein the screen is coupled to the screen support member in the plurality of locations with a plurality of fasteners.

7. The air intake assembly of claim 1, wherein the screen, the fan, the flywheel, the crankshaft and the screen support member all rotate about a rotational axis, wherein the rotational axis extends through a longitudinal center of the single fastener.

8. The air intake assembly of claim 1, wherein the single fastener is different than the fasteners used to couple the screen to the screen support member.

9. The air intake assembly of claim 1, wherein at least one of the plurality of legs defines a hole therein.

10. The air intake assembly of claim 1, wherein each of the plurality of legs defines a plurality of holes therein.

11. An air intake assembly for an engine, the air intake assembly comprising:
- a screen defining a plurality of air passage holes therein configured to allow passage of air through the screen and into the engine;
- a fan;
- a flywheel;
- a crankshaft; and
- a screen support member coupled to the screen, wherein the fan, the flywheel and the screen support member are coupled to the crankshaft, wherein the screen, the fan, the flywheel, the crankshaft and the screen support member all rotate together, wherein the screen support member includes a plurality of spaced-apart legs extending from the base, and wherein the screen is coupled to each of the plurality of spaced-apart legs.

12. The air intake assembly of claim 11, wherein the fan, the flywheel, and the screen support member are coupled to the crankshaft with a single fastener.

13. The air intake assembly of claim 11, wherein the screen is coupled to each of the plurality of spaced-apart legs with a fastener.

14. The air intake assembly of claim 13, wherein at least one of the plurality of legs defines a hole therein.

15. The air intake assembly of claim 13, wherein each of the plurality of legs defines a hole plurality of holes therein.

* * * * *